United States Patent
Kuijk et al.

(10) Patent No.: US 12,181,408 B2
(45) Date of Patent: Dec. 31, 2024

(54) CIRCUIT AND METHOD FOR FLUORESCENCE LIFETIME IMAGING

(71) Applicant: VRIJE UNIVERSITEIT BRUSSEL, Brussels (BE)

(72) Inventors: Maarten Kuijk, Antwerp (BE); Hans Ingelberts, Ukkel (BE); Cedric Baijot, Meise (BE)

(73) Assignee: VRIJE UNIVERSITEIT BRUSSEL, Brussels (BE)

( * ) Notice: Subject to any disclaimer, the term of this patent is extended or adjusted under 35 U.S.C. 154(b) by 204 days.

(21) Appl. No.: 18/015,382

(22) PCT Filed: Jul. 9, 2021

(86) PCT No.: PCT/EP2021/069150
§ 371 (c)(1),
(2) Date: Jan. 10, 2023

(87) PCT Pub. No.: WO2022/008715
PCT Pub. Date: Jan. 13, 2022

(65) Prior Publication Data
US 2023/0280272 A1    Sep. 7, 2023

(30) Foreign Application Priority Data

Jul. 10, 2020   (EP) .................... 20185370

(51) Int. Cl.
*G01N 21/64* (2006.01)
(52) U.S. Cl.
CPC ..... *G01N 21/6408* (2013.01); *G01N 21/6458* (2013.01); *G01N 2201/123* (2013.01)

(58) Field of Classification Search
None
See application file for complete search history.

(56) References Cited

U.S. PATENT DOCUMENTS 9,344,109 B2    5/2016  Ashmore, Jr.
2016/0356718 A1   12/2016  Yoon et al.
(Continued)

OTHER PUBLICATIONS

Li et al., "Hardware implementation algorithm and error analysis of high-speed fluorescence lifetime sensing systems using center-of-mass method", Journal of Biomedical Optics, Jan. 1, 2010, vol. 15, No. 1, p. 017006-1 to 017006-10.
(Continued)

*Primary Examiner* — Hoon K Song
(74) *Attorney, Agent, or Firm* — Workman Nydegger

(57) ABSTRACT

A detection system for detecting fluorescence lifetime includes an excitation light source configured for repeatedly generating pulsed excitation light, and a detector. The detector has a single-photon detection circuit; a pulse-inhibit circuit for rejecting detected photons that occur outside each one of a series of measurement time windows, each subsequent measurement time window starting after a subsequent excitation light pulse has stopped, and stopping before a next excitation light pulse is generated, each measurement time window having a measurement window period; and a switched-capacitor circuit having an input terminal for receiving a voltage ramp signal that is restarted with each new measurement window period. The switched-capacitor circuit is configured for repetitively computing an average voltage. The switched-capacitor circuit has a node for outputting the computed average voltage as a measure of the fluorescence lifetime.

20 Claims, 15 Drawing Sheets

(56) References Cited

U.S. PATENT DOCUMENTS

2019/0339201 A1* 11/2019 Seyfried ............ G01N 21/6458
2020/0333252 A1* 10/2020 Krachmalnicoff ...........................
                                                          G02B 21/0072
2020/0400568 A1* 12/2020 Kabiri ................ H01L 27/14621
2021/0270740 A1*  9/2021 Schmid ............. H01L 27/14625

OTHER PUBLICATIONS

Tancock et al., "A Review of New Time-to-Digital Conversion Techniques", IEEE Transactions on Instrumentation and Measurement, Oct. 1, 2019, vol. 68, No. 10, pp. 3406-3417.
Extended European Search Report from corresponding European Patent Application No. EP 20185370.2, Jan. 18, 2021.
International Search Report from corresponding PCT Application No. PCT/EP2021/069150, Oct. 12, 2021.

* cited by examiner

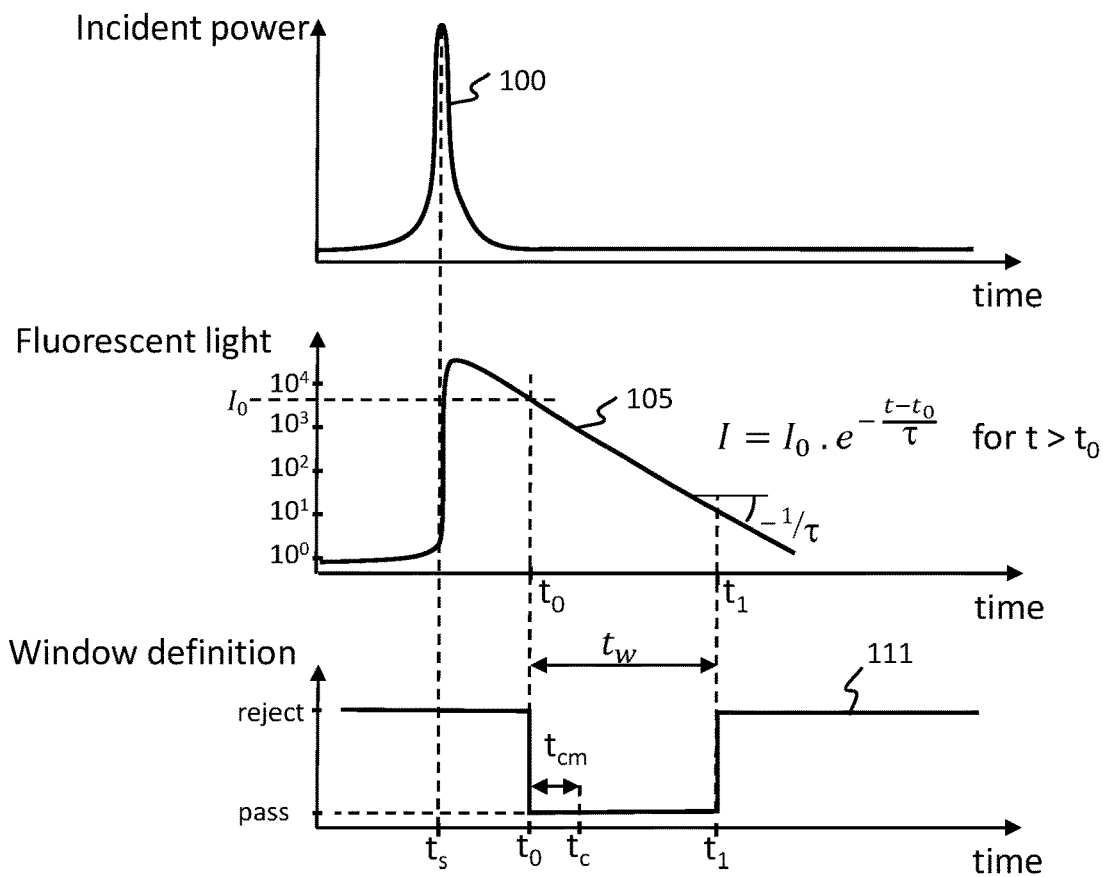
FIG. 1 – PRIOR ART
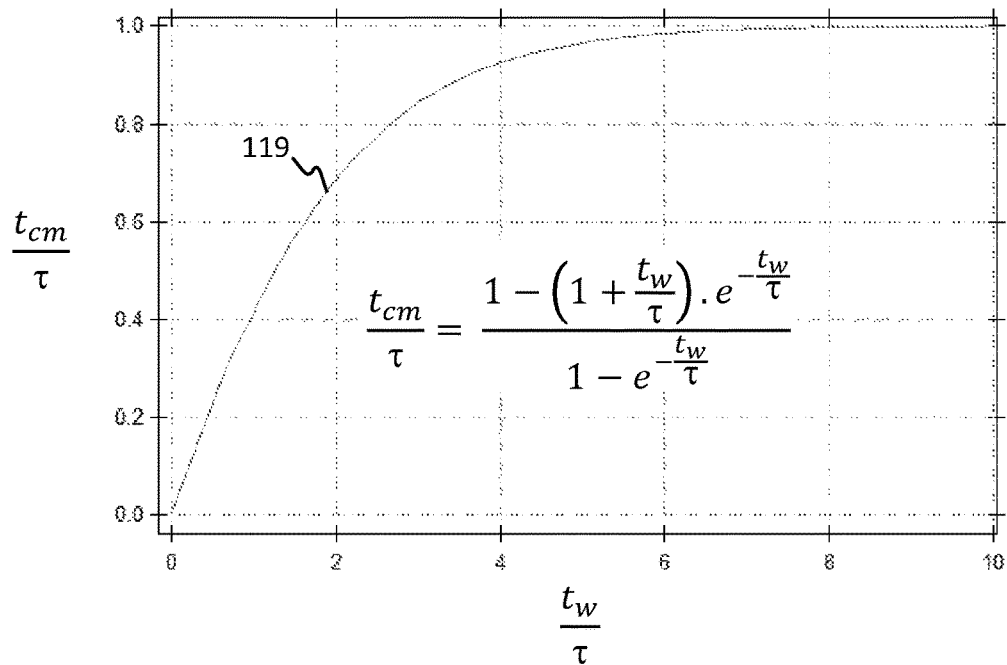
FIG. 2

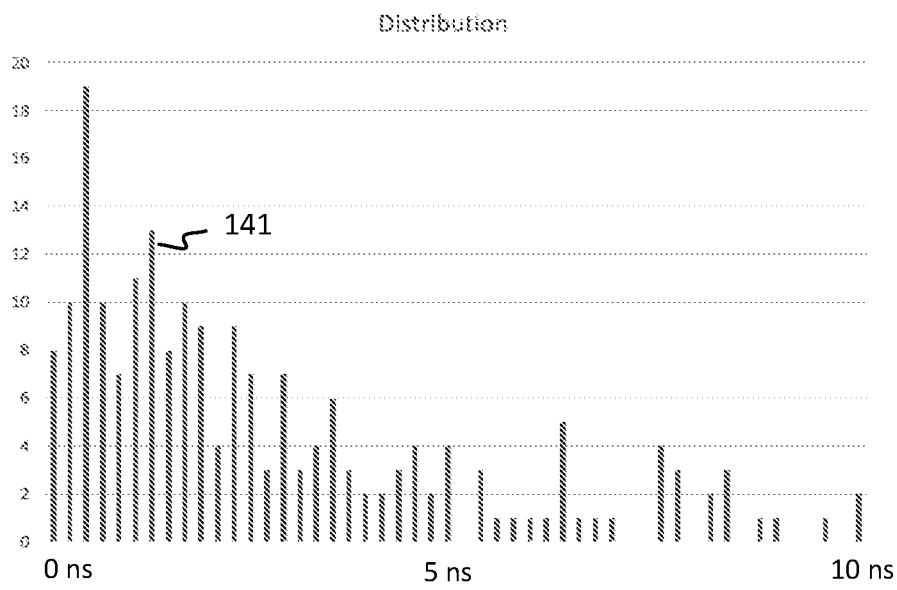
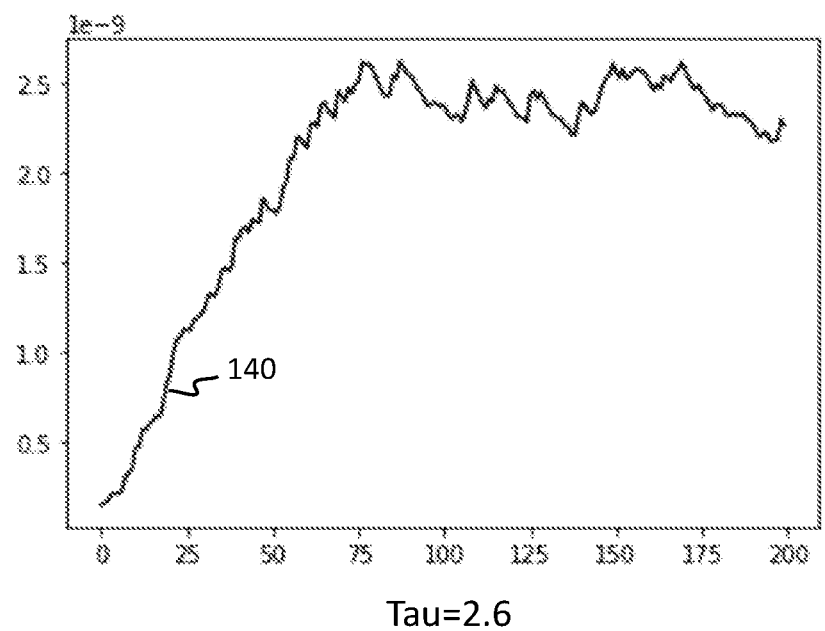
FIG. 8

CIRCUIT AND METHOD FOR FLUORESCENCE LIFETIME IMAGING

TECHNICAL FIELD OF THE INVENTION

The present invention relates to the field of capturing fluorescence light in the time domain and determining its lifetime.

BACKGROUND OF THE INVENTION

A popular method to achieve fluorescence lifetime imaging is in the frequency domain. Light stimulating a fluorophore is modulated sinusoidally, and the received fluorescence light is demodulated with the same frequency, whereby phase change and modulation depth are the prime parameters to extract the lifetime of the fluorophore.

Another way is to use the principle of rapid lifetime determination. One measures the light response by collecting the number of photons in two time windows (or bins), with a very fast gated detector.

Systems based on single-photon detectors have been proposed, wherein either gated windows are used or wherein the time of the event is recorded using counters and/or ring-oscillators (time to digital conversion) and passed on to a DSP processor that collects the data and processes the events.

SUMMARY OF THE INVENTION

It is an object of embodiments of the present invention to provide a good system and method for determining fluorescence lifetime.

The above objective is accomplished by a method and a device in accordance with the present invention.

In a first aspect, the present invention provides a detection system for detecting fluorescence lifetime. The detection system comprises an excitation light source configured for repeatedly generating pulsed excitation light, and a detector. The detector comprises a single-photon detection circuit for generating digital pulses upon detection of photons; a pulse-inhibit circuit for rejecting detected photons that occur outside each one of a series of measurement time windows, each subsequent measurement time window starting after a subsequent excitation light pulse has stopped and stopping before a next excitation light pulse is generated, each measurement time window having a measurement window period; and a first switched-capacitor circuit having an input terminal for receiving a voltage ramp signal that is restarted with each new measurement window period, the first switched-capacitor circuit being configured for repetitively computing an average voltage, based on an exponential moving average function applied to sample voltages recorded over past measurement time windows and determined by a voltage ramp signal in response to detected and not rejected photons, following the principles of the center-of-mass method. Measurements are done over subsequent measurement time windows and are averaged all the time, such that the importance in the average of samples having been taken earlier reduces over time. The switched-capacitor circuit has a first node for outputting the computed average voltage as an indirect measure of the fluorescence lifetime. The computed average voltage is an indirect measure of the fluorescence lifetime for at least two reasons: the computed average voltage is a voltage, not a time value; and calibration corrections and/or background corrections may need to be applied—depending on the circumstances of the set-up—to the computed average voltage to obtain the actual fluorescence lifetime.

In embodiments of the present invention, the exponential moving average function is implemented based on a ramp signal, by sampling the voltage of the ramp signal at the time a digital pulse is present corresponding to a detected and non-rejected photon. The sampled voltages of the ramp signal are each time used to update the exponentially moving average voltage.

In a detection system in accordance with embodiments of the present invention, the first switched-capacitor circuit may comprise a first sampling capacitor, and a first switch and a second switch for coupling the first sampling capacitor alternately to a ramp terminal for receiving a ramp signal, and to the first node. This way, the ramp signal is sampled and the sampled voltage is used to update the exponentially moving average voltage, as explained above.

In embodiments of the present invention, the first switched-capacitor circuit may furthermore comprise a second capacitor configured for being in a charge sharing redistribution configuration when the second switch is driven for coupling the first sampling capacitor to the first node. In embodiments of the present invention, the first sampling capacitor is at least an order of magnitude, preferably at least two orders of magnitude, smaller than the second capacitor.

A detection system in accordance with embodiments of the present invention may further comprise means for temporarily adding one or more capacitors in parallel to the first sampling capacitor.

A detection system in accordance with embodiments of the present invention may further comprise a second switched-capacitor circuit connected in series to the first node of the first switched-capacitor circuit and configured for operating at an oscillation rate that is not in direct response to incident photons. The oscillation rate may be determined by application requirements.

The second switched-capacitor circuit may comprise a second sampling capacitor, a first switch and a second switch for coupling the second sampling capacitor alternately to the first node for receiving computed average voltage as a measure of the fluorescence lifetime, and to an output node. In embodiments of the present invention, the second switched-capacitor circuit may furthermore comprise a fourth capacitor configured for being in a charge sharing redistribution configuration when the second switch is driven for coupling the second sampling capacitor to the output node. The second sampling capacitor may be at least an order of magnitude, preferably at least two orders of magnitude, smaller than the fourth capacitor.

A detection system in accordance with embodiments of the present invention may furthermore comprise a non-overlapping switch-enable circuit for providing non-overlapping signals for actuating the switched-capacitor circuit. In embodiments of the present invention, the non-overlapping switch-enable circuit comprises a one-shot circuit, that generates an output pulse of pre-defined duration upon being triggered, and thereafter returns to its stable state and produces no more output until being triggered again.

In accordance with embodiments of the present invention, the single-photon detection circuit may comprise a single photon avalanche detector (SPAD). In such embodiments, the pulse-inhibit circuit may comprise a variable voltage source adapted for lowering a voltage over the single photon avalanche detector. In embodiments of the present invention, the pulse-inhibit circuit may be adapted for intercepting one of the signals for driving the switched-capacitor circuit, for thus preventing a pulse to be taken into account.

A detection system in accordance with embodiments of the present invention may further comprise at least one further pulse-inhibit circuit and at least one further switched-capacitor circuit, configured for operating in parallel with the pulse-inhibit circuit and the switched-capacitor circuit.

A detection system in accordance with embodiments of the present invention may further comprise a photon counter circuit for counting a number of detected photons. In embodiments wherein the detector comprises a non-overlapping switch-enable circuit for providing non-overlapping signals for actuating the switched-capacitor circuit, the photon counter circuit may comprise a switched capacitor circuit adapted to be actuated by the non-overlapping signals for actuating the switched-capacitor circuit.

In embodiments comprising means for temporarily adding one or more capacitors in parallel to the sampling capacitor, these may comprise one or more switches, in series with the one or more capacitors, respectively, the one or more switches being opened upon the photon counter circuit having counted a predetermined number of detected photons.

In a second aspect, the present invention provides a fluorescence imaging sensor comprising an excitation light source configured for repeatedly generating pulsed excitation light and an array of detectors, each detector comprising a single-photon detection circuit for generating digital pulses upon detection of photons, a pulse-inhibit circuit for rejecting detected photons that occur outside each one of a series of measurement time windows, each subsequent measurement time window starting after a subsequent excitation light pulse has stopped and stopping before a next excitation light pulse is generated, each measurement time window having a measurement window period, and a first switched-capacitor circuit having an input terminal for receiving a voltage ramp signal that is restarted with each new measurement window period, the first switched-capacitor circuit being configured for repetitively computing an average voltage, based on an exponential moving average function applied to sample voltages recorded over past measurement time windows and determined by the voltage ramp signal in response to detected and not rejected photons, following the principles of the center-of-mass method, the first switched-capacitor circuit having a first node for outputting the computed average voltage as a measure of the fluorescence lifetime. Details of the detectors in the array may be as set out in the different embodiments of the first aspect of the present invention.

In a third aspect, the present invention provides a method for determining fluorescence lifetime. The method comprises generating digital pulses upon detection of photons; rejecting detected photons that occur outside a measurement time window; computing an average voltage, based on an exponential moving average function applied to sample voltages determined by a voltage ramp signal in response to the detected and not rejected photons, recorded over past measurement time windows following the principles of the center-of-mass method; and outputting the computed average voltage as a measure of the fluorescence lifetime. In embodiments of the present invention, the computed average voltage may be further averaged.

It is an advantage of embodiments of the present invention that the timing of photon arrival, being anyhow available when using single photon detectors like SPADs, is fully exploited in the determination of the lifetime thanks to using the center of mass principle. Furthermore, each of the events detected in a time window takes part in the determination of the lifetime estimate. That window can cover most of the available fluorescence light, so basically the system is close to what can be considered optimal. With a single window, e.g. 20 ns, one can detect a lifetime in a wide range, from 200 ps to 15 ns. The system can be running continuously, and asynchronously, and one can get the best lifetime estimation of the last number of events/detections without having the risk of overflowing detectors, or on the other hand having too little signal. Even very low light conditions can be handled, the system being mainly shot noise limited. Herefor a sliding average, based on the exponential moving average, is used that has a settable memory depth based on a capacitor ratio. Older measurements are taken less into account, more recent ones are taken more into account. Readout values can be analogue; however, the ADC doesn't require a high number of significant bits. The in-pixel averaging can be complemented by second stage averaging e.g. in DSP, to achieve optimal results. Read-out of the pixel array is not timing critical; it can be done in the background. Further, a second longer window in which center of mass in the time domain is averaged, can be operated simultaneously, for taking background light and/or dark count rate of the single photon detector into account. A third window allows to discover multiple fluorophore lifetimes, and their relative importance. Delay aspects in parts of the system can be investigated with a differently positioned window. In that way one can discover the onset of the fluorescence light being for example useful to position the window(s) for the lifetime estimation closer to its optimal position. The circuitry for estimation of the time-domain center of mass in a time window including averaging is very small, and multiple of these instances can be included on a per-pixel base for simultaneous operation. Consecutive operation of different time-windows is also feasible. A photon counter based on a similar circuit is also proposed in case classical illumination levels need to be detected simultaneously.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which:

FIG. 1 shows the center of mass method in a time window $t_w$ used for determining the lifetime $\tau$ of, pulse stimulated 100, fluorescence light 105 (prior art).

FIG. 2 shows the deviation of the measured center of mass lifetime $t_{cm}$ relative to the real lifetime $\tau$, in function of the actual time window period $t_w$ relative to said lifetime $\tau$.

FIG. 8 shows a simulation demonstrating the exponential moving average based on a statistical model according to embodiments of the present invention.

Figure 3:
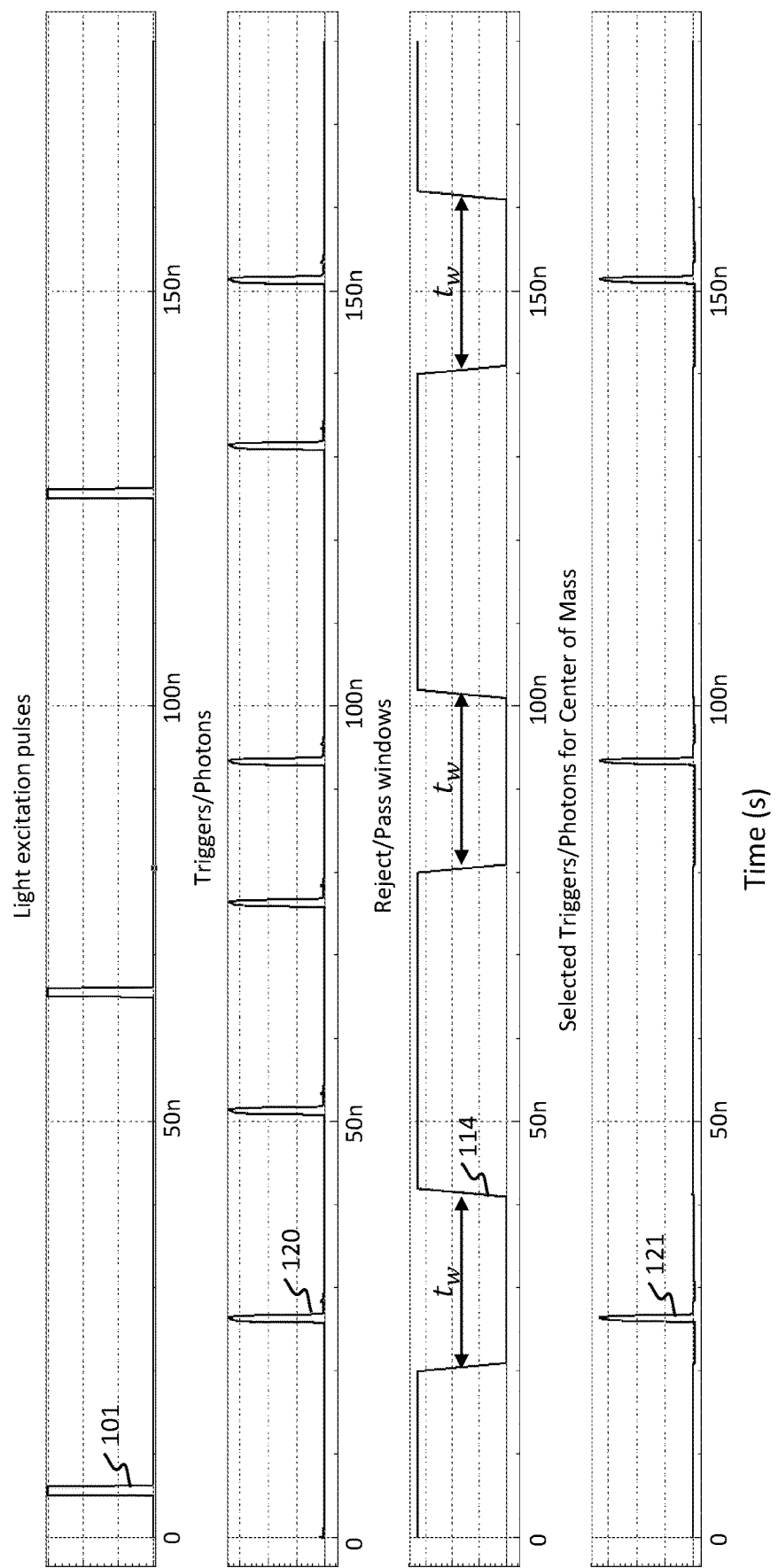
FIG. 3 shows the rejection of triggers/photons outside the predetermined time window $t_w$ when measuring over many periods, according to embodiments of the present invention.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention. In the different figures, the same reference numbers refer to the same or analogous elements.

DETAILED DESCRIPTION OF THE INVENTION

The present invention will be described with respect to particular embodiments and with reference to certain drawings, but the invention is not limited thereto but only by the claims. Any reference signs in the claims shall not be construed as limiting the scope.

The terms first, second and the like in the specification, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter. Thus, the scope of the expression "a device comprising means A and B" should not be limited to devices consisting only of components A and B. It means that with respect to the present invention, the most relevant components of the device are A and B.

Similarly, it is to be noticed that the term "coupled" should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

Definitions

Fluorescence is the emission of light by a fluorophore that has absorbed electromagnetic excitation radiation, for example light, upon excitation therewith. In most cases, the emitted light has a longer wavelength, and therefore lower photon energy, than the absorbed excitation radiation.

Fluorescence lifetime is a measure of the time a fluorophore spends in the excited state before returning to the ground state by emitting a photon. The lifetime of a fluorophore can range from picoseconds to hundreds of nanoseconds.

Fluorescence-lifetime imaging microscopy (FLIM) is a technique for producing an image based on differences in exponential decay rate of fluorescence from a fluorescent sample. The lifetime of a fluorophore signal, rather than its intensity, is used to create the image in FLIM. Many other applications (that are not necessarily called FLIM) are in need of fluorescence-lifetime imaging, for example in image guided surgery and biomedical applications, where lifetime gives additional information about the chemical/biological environment of the fluorophore.

When a fluorophore gets hit, e.g. illuminated, by a pulse of electromagnetic radiation, e.g. a light-pulse, that excites its internal state, electrons will move to a higher energy state for some time. They will go back to their original state by emitting photons or heat, in an exponential decay process characterized by the fluorophore's fluorescence lifetime. The average time the fluorophore stays in its excited state and emits photons, is called the fluorescence lifetime. In FIG. 1, the applied excitation light 100 is assumed a short and powerful pulse with a predetermined wavelength from a radiation source, e.g. a laser, and with a peak at a stimulation moment $t_s$. The fluorescent light 105 (typically exhibiting a longer wavelength) starts from the stimulation moment $t_s$ at which the fluorophore is being excited, and after the excitation stops, the fluorescent light 105 demonstrates a decay that is exponential with the lifetime τ of the fluorophore. The curve of the generated fluorescent light 105 is on a logarithmic scale a linear curve with a downward $-1/\tau$ slope. One of the known measurement techniques for quantifying the lifetime τ is referred to as the center of mass method. To apply this method, one can define a window period $t_w$ that starts when the excitation light 100 stopped, e.g. at a first moment $t_0$, and that preferably is longer than the lifetime to be measured, up to a second moment $t_1$ ($t_w=t_1-t_0$). The light emission is then according to the following formula:

$$I = I_0 \cdot e^{-\frac{t-t_0}{\tau}} \text{ for } t > t_0$$

with $I_0$ the intensity of emitted fluorescent light at the first moment $t_0$.

One can then define the center of mass $t_{cm}$ as a time period between the first moment $t_0$ and a center moment $t_c$ according to the following, using first order momentum:

$$t_{cm} = t_c - t_0 = \frac{\int_{t_0}^{t_1} t \cdot I \, dt}{\int_{t_0}^{t_1} I \, dt}$$

It is generally believed that the measurement window period $t_w$ must be much longer than the fluorophore's lifetime (so $t_w \gg \tau$); however, with some math one can find the deviation for the inaccuracy of shorter window periods $t_w$ and compensate for it when necessary. FIG. 2 shows the relative compensation 119 one needs to apply. Curve-fitting a simple curve through 119 can easily make this relationship explicit, such that when measuring the center of mass $t_{cm}$, and knowing the applied measurement window period $t_w$, one can deduce the real lifetime τ. In other words, it is also possible to measure a lifetime of e.g. 1 ns, with a window period of e.g. 2 ns using a center of mass method. In what follows it is assumed that by finding the first order momentum $t_{cm}$, and knowing the measurement window period $t_w$, the person skilled in the art can deduct the actual lifetime τ.

In an image sensor, wherein the pixels are small, and the number of photons originating from the fluorescent scene is small, one can't rely on a single shot measurement, like the one proposed in FIG. 1. In reality it is very well possible that only a few photons, or one, or even no photons arrive at the detector during a single window period $t_w$. This complicates the measurement a lot, because one now must re-apply the excitation light pulse 100 many times and collect the data during each window period $t_w$ and in some way compute the center of mass $t_{cm}$ from all those trigger events. To make it feasible, in accordance with embodiments of the present invention, a single photon detection circuit 150 will be relied on. Such single photon detection circuit 150 generates a clear digital pulse each time it detects a photon. In order to get enough information, in the example illustrated, an excitation pulse 100 is re-applied at a repetition rate that is low enough to have a period that is longer than the measurement window period $t_w$. The repetition rate can be chosen freely, but may in practice depend on many elements, such as, but not limited thereto, the performance of the laser, the maximum light intensity that is allowed for eye-safety, and/or the fact that one may get bleaching, whereby the fluorophore gets temporarily saturated or even damaged. Another element that may play a role is the fact that background light also gives photons, and/or that the used detector has its own dark-current (or dark count rate DCR), complicating the measurement even more. In the embodiment illustrated in FIG. 3, light pulses are repeatedly generated at a fixed repetition rate. In other embodiments, however, not illustrated, no such fixed repetition rate is required, and light pulses may be repeatedly generated with variable breaks in between. Similarly, measurement window periods may or may not have the same length.

In FIG. 3, curve 101 is the excitation light 100 that is pulsed with a repetition every 60 ns, so at a 16.667 MHz repetition rate. Trigger curve 120 shows trigger/photon events that the used single photon detection 150 circuit outputs when a detector element, for instance a SPAD, detects presence of photons. This includes incoming light from fluorescence, e.g. fluorescent light being emitted by fluorophores having been excited by the excitation light pulses 100 in the curve 101, light from background illumination, and dark counts from the detector itself. In FIG. 3, six such events occur, but one cannot tell the origin of any of these six events. Nevertheless, it can be assumed for now that the background and dark counts are very low in number compared to the fluorescence light. Reject curve 114 shows three consecutive time windows, with a measurement window period $t_w$=20 ns, also repeated every 60 ns. When the reject curve signal has a first value, e.g. high, the pulses from the trigger curve 120 are rejected, and when it has a second value, e.g. low, the pulses are allowed into the measurement process, giving the selected trigger curve 121. This cycle can be repeated for e.g. tens of microseconds, or even several milliseconds, all the time passing the pulses only when the reject curve 114 has the second value, e.g. low.

Figure 4:
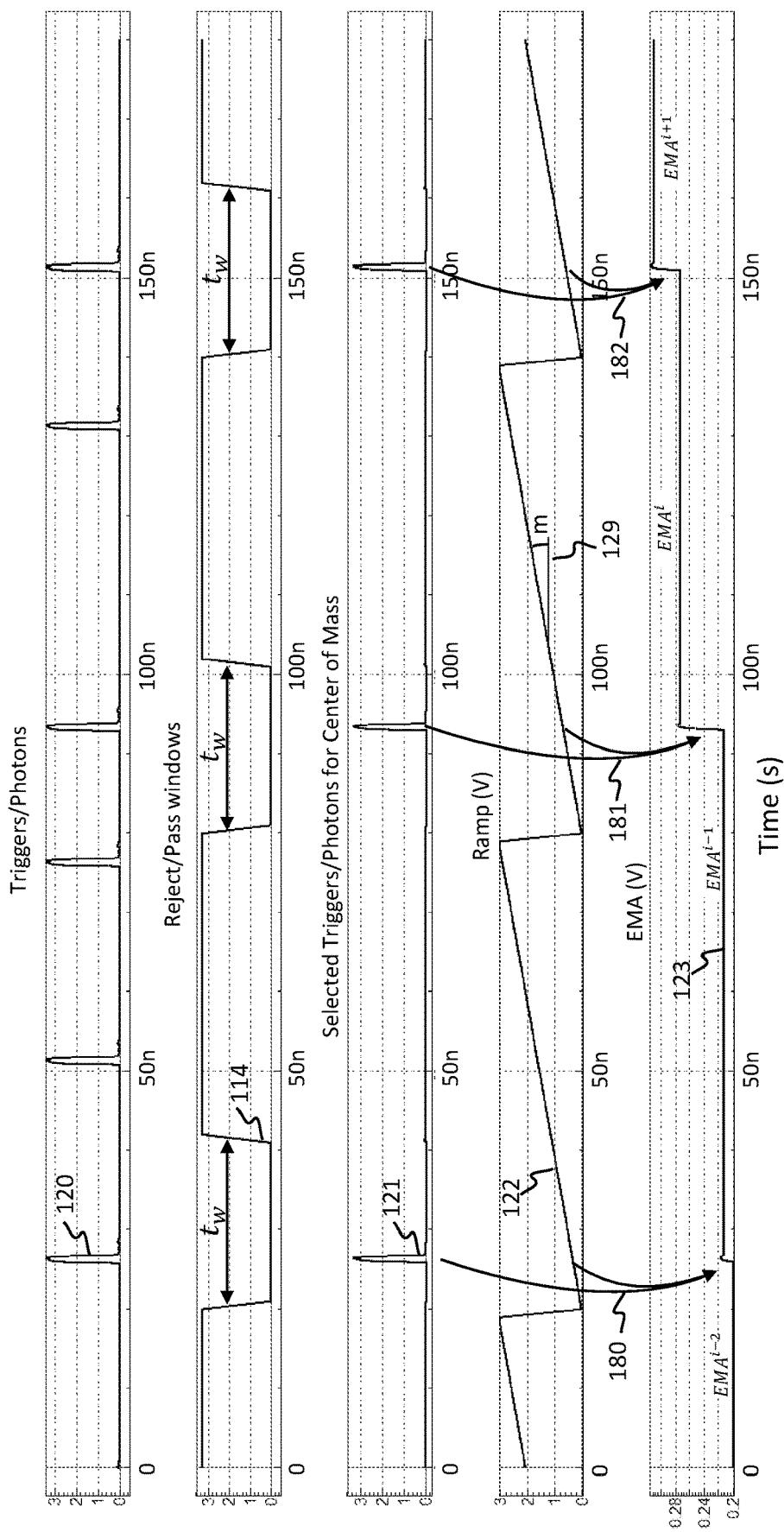
FIG. 4 shows the use of a voltage ramp with slope m 129 in the time window $t_w$ and its sampling events 180, 181 & 182, updating the exponential moving average (EMA) voltage according to embodiments of the present invention.

Now, in FIG. 4, a voltage ramp signal 122 with slope m is applied each new measurement window period $t_w$. This voltage ramp signal 122 is getting sampled at the moment a selected trigger occurs in the selected trigger curve 121, giving samples $V_s^{i-2}, V_s^{i-1}, V_s^i$ in response to the start of each event 180, 181 & 182 in the trigger curve 121. This can be seen as a time-to-analog conversion (TAC), or time-to-voltage conversion, whereby the time is the period from the start of the measurement window period $t_w$ until the event itself, and the analog signal is the sampled voltage $V_s^i$. Sample $V_s^i$ is each time used to update the exponentially moving average voltage EMA that resides on a capacitor according to the principles of the "exponential moving average":

$$EMA^i = \frac{n-1}{n} \cdot EMA^{i-1} + \frac{1}{n} \cdot V_s^i$$

Averaging-length n is a number that tells how deep the memory into the past is. E.g. with n=99, at every new sample, the previous result is reused for 99%, and the new sample counts only for a fresh 1%. Samples further in the past become gradually less important, recent samples are more important. The difference with a "simple moving average", is that for achieving the latter, one must keep a list of the last 100 occurrences, and at each new event, one has to drop the value of the oldest event, include the new event, and recalculate the average of the adapted set of 100 events. This takes a lot of computation and memory, and is hard to achieve on a per pixel base in an image sensor.

By taking the exponential moving average of time-to-voltage converted samples, a time-domain center-of-mass method is achieved.

The EMA curve 123 has a voltage level that is in this particular example three times below the ramp voltage on voltage ramp signal curve 122 at the three events 180, 181 & 182, with as a result, small step increases at each of these moments (in this simulation n=7). In this example one detection event is passed every window; however, it is equally possible that, for instance at high light level conditions, there are many more events in a same window, and even so, with low light levels, it can happen that there are one, more, or many windows without any event. There is no operational problem when having multiple events in a same window. In case there are really many, and this would be happening also in many windows, there is a pile-up of information, which could reduce the accuracy. Whether that would be a problem depends on a lot of factors, including the dead-time, how many events take place in a same window, how often this is occurring, the application and the desired accuracy. In such situations it could be a solution to reduce the amplitude of the excitation light source.

The voltage ramp signal curve 122 may be, but does not need to be, a perfectly straight line; it should in its window be at least monotonically rising or falling. It can start at zero volt, but it can also start at any other suitable voltage level, as long as the voltages during the ramp are in the operation range of the switches of the attached switched-capacitor circuit 160 (see below). Once the EMA curve 123 gets to convergence, the sampled voltages will statistically kick the EMA voltage up and down, and not always in the same direction as in the three events 180, 181 & 181.

Figure 5:
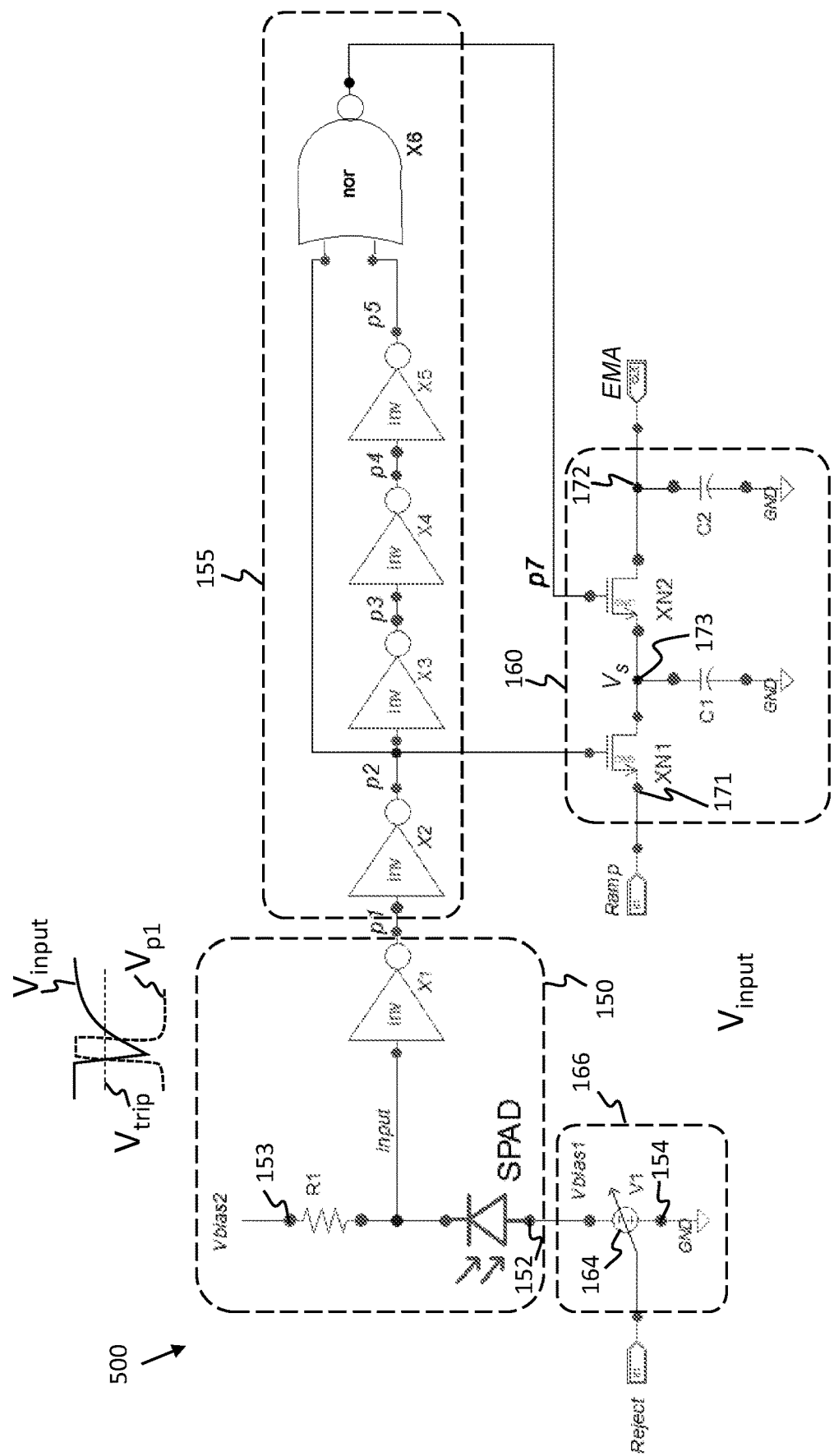
FIG. 5, shows an embodiment of a circuit implementation of the present invention having a single photon detection circuit 150, a non-overlapping switch-enable circuit 155, a pulse-inhibit circuit 166 and a switched-capacitor circuit 160.

FIG. 5 illustrates a fluorescence lifetime determination circuit 500 in accordance with one embodiment of the present invention. The circuit 500 comprises a single photon detection circuit 150 for detecting occurrence of photons, even if they are limited to very limited in number and for correspondingly generating a trigger pulse; a pulse-inhibit circuit 166 for rejecting trigger pulses that occur outside a measurement time window; a switched-capacitor circuit 160 for performing an exponential moving average function; and a non-overlapping switch-enable circuit 155 for generating the signals for driving the switched-capacitor circuit 160.

The single photon detection circuit 150, in the embodiment illustrated, implements a Single Photon Avalanche Diode (SPAD) detector. The SPAD detector is a semiconductor pn-diode junction that is reversely biased beyond its breakdown voltage, in a metastable state. The SPAD detector is coupled in series with a resistor R1, and this series connection is coupled between a first node 152 and a second node 153. The first node 152 is biased at a first bias voltage Vbias1 and the second node is biased at a second bias voltage Vbias2, Vbias2 being higher than Vbias1 so as to obtain the reverse biasing of the SPAD detector. A single photon can start a breakdown and give a large voltage signal when being biased through the resistor R1, the voltage signal being a temporary voltage drop ($V_{input}$), as can be seen in FIG. 5. The voltage over the SPAD detector drops until below the SPAD detector's breakdown voltage, whereby the breakdown stops, followed by the diode voltage returning to its original voltage due to the attached resistor R1, the system becoming again metastable. That drop can be detected by a suitable detection circuit, such as an inverter or a comparator circuit (in circuit 150 exemplified, as an example only, the present invention not being limited thereto, with an inverter X1 having a tripping voltage $V_{trip}$), generating a trigger pulse $V_{p1}$ on node p1, the start of the trigger pulse being indicative for the moment that the photon was incident on the detector. Trigger curve 120 in FIG. 3 and FIG. 4 shows six such trigger pulses $V_{p1}$ on node p1. There are many types of SPAD detectors and even SPAD circuits, including active ones, (e.g. with active or passive quenching) and types of circuits that are known in the state-of-the-art, and each of them can be used in conjunction with this invention. Single photon detection circuit 150 can include any SPAD or any single photon detector. Common to these circuits is that their output is a digital trigger pulse, of which the start is indicative for the moment of the photon absorption. The width of the trigger pulse is not so meaningful and can often be somewhat variable.

Two exemplary systems are described in this specification for inhibiting the pulses outside the measurement time windows. The first one, pulse-inhibit circuit 166 in FIG. 5, implements the rejection of events by lowering the voltage across the SPAD detector. Hereto the pulse-inhibit circuit 166 comprises a variable voltage source 164 coupled between the first node 152 and a third node 154, for example ground. When an input signal Reject to the pulse-inhibit circuit 166, more particularly to the voltage source 164 thereof, is high, an output voltage V1 of the voltage source 164 is adapted, e.g. raised or brought to a higher level, such that the first bias voltage Vbias1 is high, and hence the voltage across the SPAD gets below its breakdown voltage, and breakdowns get prevented. When the input signal Reject to the pulse-inhibit circuit 166, more particularly to the voltage source 164 thereof gets low, an output voltage V1 of the voltage source 164 is adapted, e.g. lowered or brought to a low level, such that the first bias voltage Vbias1 is low, and hence the voltage across the SPAD is again increased, such that breakdown is again possible. The first voltage Vbias1, is often not in the voltage range of the digital power supply range of the sensor logic and modulating the SPAD's bias is therefore not easy to implement in a high-speed way (with tens of picoseconds of precision). Vbias1 is e.g. −20V to achieve SPAD biasing beyond its breakdown voltage, whilst Vbias2 is one or two volts above $V_{trip}$, the tripping voltage of the inverter X1. A more advantageous solution that is operative in the digital domain is therefore proposed and explained hereinbelow with reference to FIG. 6.

A switched-capacitor circuit 160 is used for performing an exponential moving average function, as also illustrated in the bottom graph of FIG. 4. The switched-capacitor circuit 160 as illustrated in FIG. 5 comprises two switches XN1, XN2 coupled in series between an input terminal, ramp terminal 171, and an output terminal, EMA terminal 172. At a sample node 173 between the two switches XN1, XN2, a first capacitor C1 is coupled to ground. At the output terminal 172, a second capacitor C2 is coupled to ground.

The switches XN1, XN2 of the switched-capacitor circuit 160 are actuated such that only one of the switches XN1, XN2 is conductive at any moment in time. The driving signals for actuating the switches XN1, XN2 are received from a non-overlapping switch-enable circuit 155 that is explained in more detail below.

In the embodiment illustrated in FIG. 5, the switches XN1, XN2 are implemented by means of NMOS pass-gates. The gates of these NMOS pass-gates are coupled to and receive actuating signals from a non-overlapping switch-enable circuit 155.

The non-overlapping switch-enable circuit 155, in particular embodiments of the present invention, comprises an even sequence of inverters which are coupled in series. In this example, there are four inverters X2, X3, X4, X5, with output nodes p2, p3, p4, p5 respectively. Node p2 is the first switch-enable output signal to actuate the first switch XN1 of the switched capacitor circuit 160. This node p2 is also an input to a NOR gate X6 that also has p5 as input. When p1 goes high, p2 goes low, and p5 being low already will go high three inverter delays later. This leave a period of three inverters delays that both inputs of the NOR X6 are low, during which the NOR gate X6 outputs a high on its output p7. This is basically a one-shot circuit: the input p1 goes high (for example during 3 ns), and output p7, goes high for a predetermined short period (e.g. 1 ns), determined by three inverter delays. The output signal of the NOR gate X6 is fed to the second switch XN2 for actuation thereof, for instance to the gate of the NMOS pass-gate. Many alternative one-shot circuits are possible, known to a person skilled in the art.

As illustrated in the one but last graph of FIG. 4, a ramp voltage 122 is used in the performing of the exponential moving average function. The ramp voltage, to be generated externally, is applied at the Ramp terminal 171 and is connected to the source of a first switch XN1, that in the embodiment illustrated, is made by an NMOS pass-gate. The signal $V_s$ at the drain of the first switch XN1, i.e. at the sample node 173, follows the voltage ramp signal 122 (FIG. 4), as long as the gate of the first switch XN1 is biased high, waiting for an event.

Figure 7:
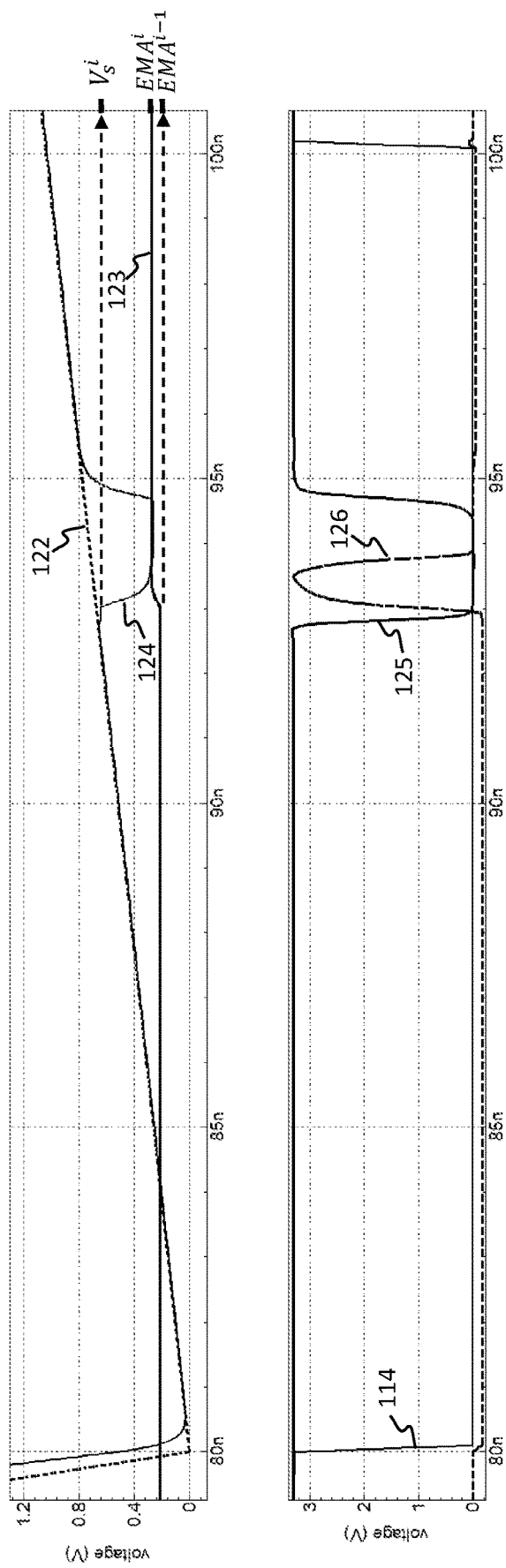
FIG. 7, demonstrates the particular operation of the switched-capacitor circuit 160 according to embodiments of the present invention, driven by non-overlapping switch-enable signals 125 & 126, sampling $V_s^i$, from the ramp signal 122 and updating the exponential moving average EMA voltage curve 123.

FIG. 7 is illustrative for this process. The signal corresponding to the passed-on trigger pulse, e.g. the signal on output node p2 of inverter X2, is represented by curve 125, and the signal at output node p7 of the NOR gate X6 is represented by curve 126. Around time=93 ns, the voltage on node p2 drops, and the first switch XN1 stops being conductive. The voltage present at that moment in time at the sample node 173 is a sample $V_s^i$ of the ramp voltage that was applied at that moment in time to the ramp terminal 171. The sample $V_s^i$ is now present/valid and holds that voltage level thanks to capacitor C1. The signal at node p7 (curve 126), not overlapping with the signal at node p2 (curve 125), now goes high, making the second switch (NMOS pass-gate) XN2 conductive. First and second capacitors C1 and C2 get shorted to each other (curve 124, illustrating the voltage at the sample node 173, and curve 123, illustrating the voltage at the EMA terminal 172, coming together at t=93.5 ns), and a charge sharing redistribution takes place whereby the signal $V_s^i$ and the output signal EMA (curve 123) move to each other determined by the ratio of C1/C2. If the first capacitor C1 is hundred times smaller than the second capacitor C2, then n=100. The voltage on the sample node 173 moves approximately 99% towards the voltage at the EMA terminal 172, and the voltage at the EMA terminal 172 moves approximately 1% towards the voltage at the sample node 173. Roughly speaking, one can say that the last 100 samples determine mostly the effective average outcome. In the examples of FIGS. 4 & 7, then number is chosen quite small (n=7) making the voltage jumps more easily visible. The following holds approximately:

$$n = C_2/C_1.$$

When an output is wanted that has a good precision, n should be taken high, i.e. between 100 and 1000, what increases the number of samples needed for convergence after initialization of the filter, or after a sudden lifetime change. One cannot tell whether this will then take a measuring time of microseconds or milliseconds, because the time it takes to change, entirely depends on the number of incoming photons/events and the n-value. It is an option to keep the number n relatively low, e.g. at 50, and to sample the EMA output from outside the pixel, and to do additional external calculations and averaging, thereby increasing the accuracy and precision in a second step, e.g. with DSP digital processing means.

FIG. 8 shows the operation whereby n=50, simulation is run for 200 samples passing the measurement time windows with a time distribution generated by a random generator that takes into account an exponential decay behavior with a lifetime of 2.6 ns. The measurement window period $t_w$ is set to 10 ns, and the repetition rate to 10 MHz. Bar-chart 141 shows the histogram of the 200 recorded events over the 10 ns window period. Curve 140 is the EMA signal (in this simulation it is in nanoseconds) beginning at a start condition of 0 ns. After 75 samples, a steady state occurs with an average of about 2.4 ns and a precision of 7% on the lifetime (for the samples from 100 till 200). Using curve 119 in FIG. 2, one can correct for the fact the lifetime is about $\frac{1}{4}^{th}$ of the sampling window (of 10 ns), and that brings the result to close the original 2.6 ns lifetime used for the lifetime distribution sample generation. The precision and the accuracy adapt according to normal statistical rules: for example, when increasing n by a factor of 4, a precision increase of a factor 2 is obtained.

In practice, the accompanying circuit that is located in a pixel should be as small as possible, in order for the pixel to have a fill factor as high as possible. It can therefore be advised to omit the first capacitor C1 entirely, and to rely on the remaining parasitic capacitance of the concerned sample node 173. After having an estimate of the parasitic value C1, one can choose C2 to be n times that value. C2 can then be implemented by the person skilled in the art, in the way it fits best into an imager pixel.

The more samples are averaged, the better the precision gets. Therefore, it is advantageous to use a large averaging length n. However, even with a small first capacitor C1, the second capacitor C2 will take up some area of the pixel, and making the second capacitor C2 larger, typically requires more area in the pixel. In embodiments of the present invention, the second capacitor C2 can be made similar to a capacitor in a dynamic RAM cell, with a deep hole in the substrate providing a large capacitor on a small area.

Figure 15:
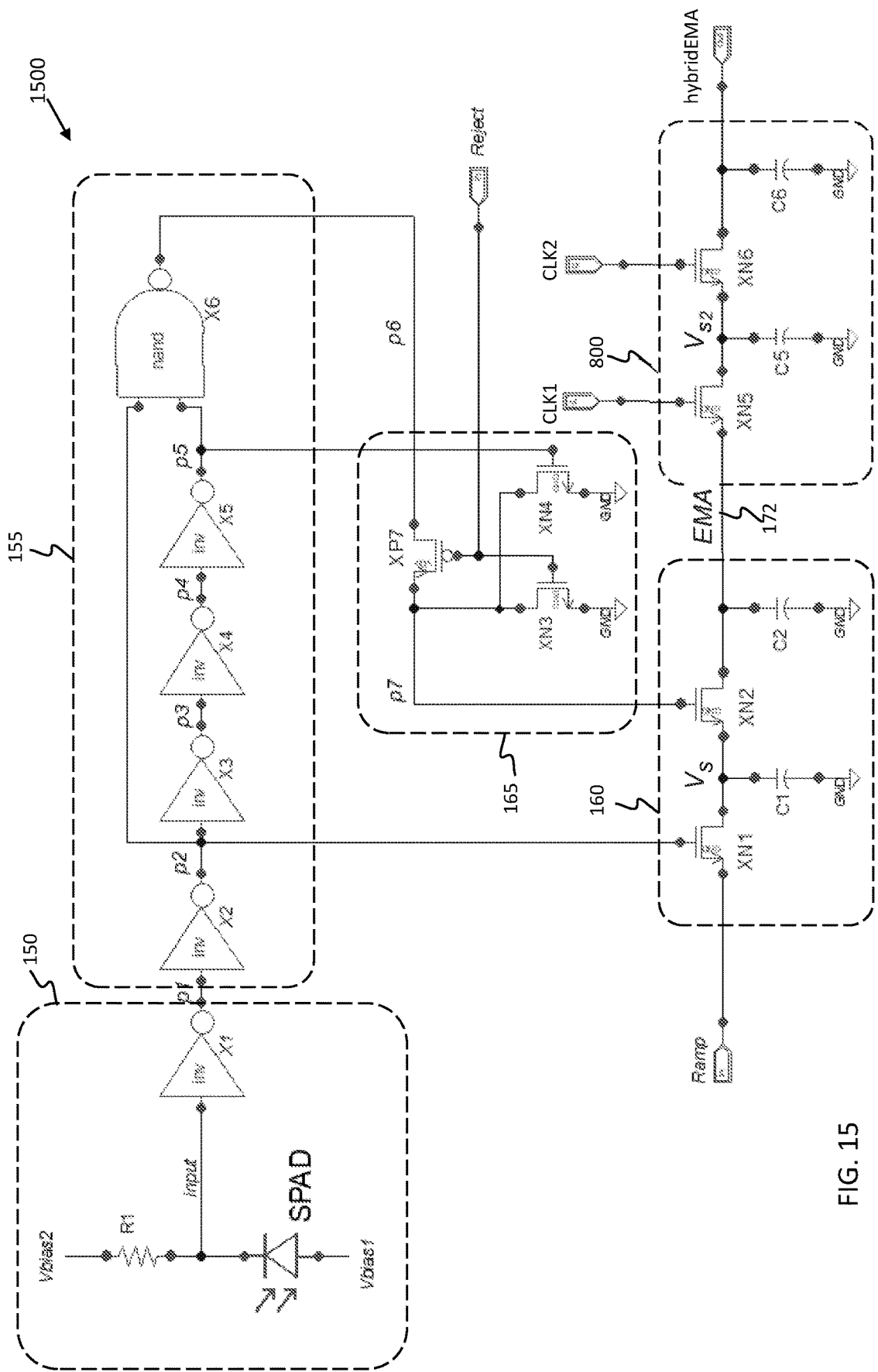
FIG. 15 shows a particular circuit implementation in accordance with embodiments of the present invention, having hybrid EMA averaging: a first switched capacitor circuit 160 that operates in response to passing SPAD events being followed by a second switched capacitor circuit 800 driven by a first and a second clock signal CLK1 & CLK2.

In embodiments of the present invention, two switched capacitor circuits can be implemented, operating on different clocks. An example thereof is illustrated in FIG. 15, in which a first switched capacitor circuit 160 is operated on each passed event (like in all other previous embodiments) providing a voltage named EMA on the second capacitor C2, whilst a second, subsequent switched capacitor circuit 800 is operated at an oscillation rate, that is not in response to incident photons, but that can be fixed or settable. The structure of the second switched capacitor circuit 800 is similar to that of the first switched capacitor circuit: it comprises two switches XN5, XN6 coupled in series between an input terminal, 172, and an output terminal, hybridEMA. At a sample node Vs2 between the two switches XN5, XN6, a third capacitor C5, functioning as sampling capacitor, is coupled to ground. At the output terminal hybridEMA, a fourth capacitor C6 is coupled to ground. The third switch XN5 and the fourth switch XN6 allow coupling the third capacitor C5 alternately to the node 172 for receiving computed average voltage as a measure of the fluorescence lifetime, and to the output node hybridEMA. The fourth capacitor C6 is configured for being in a charge sharing redistribution configuration when the fourth switch XN6 is driven for coupling the third capacitor C5 to the output node (hybridEMA). In embodiments of the present invention, the third capacitor C5 may be at least an order of magnitude, preferably at least two orders of magnitude, smaller than the fourth capacitor C6.

The output signal hybridEMA, being the voltage on the fourth capacitor C6, is then the output for read-out. A regular oscillator with frequency $f_{clk}$ can for example be used for generating non-overlapping clock signals for the inputs CLK1 and CLK2. Non-overlapping indicates that the switches XN5 and XN6 are never conductive at the same moment. CLK1 drives switch XN5 and CLK2 drives switch XN6. XN5 and XN6 are in this example NMOS pass-gates. The voltage on the third capacitor C5 is a sample of the EMA voltage at the moment CLK1 goes low, and switch XN5 stops conducting. Clk2 then goes high, and a charge sharing occurs between the third capacitor C5 and the fourth capacitor C6. This then gives a classical switched capacitor low pass filter 800, with a −3 dB corner frequency of $$f_{3dB} \sim \frac{f_{clk} \cdot C3}{2\pi \cdot C4}$$

The averaging length of the first stage n1=C2/C1, that of the second stage n2=C6/C5, will give a total averaging length of n1·n2=(C2·C6)/(C1·C5). So, if n1=n2=100, a maximum averaging can be reached of 10000. Averaging of 10000 samples gives a relative fluorescence lifetime precision of 1%, according to theory.

Figure 16:
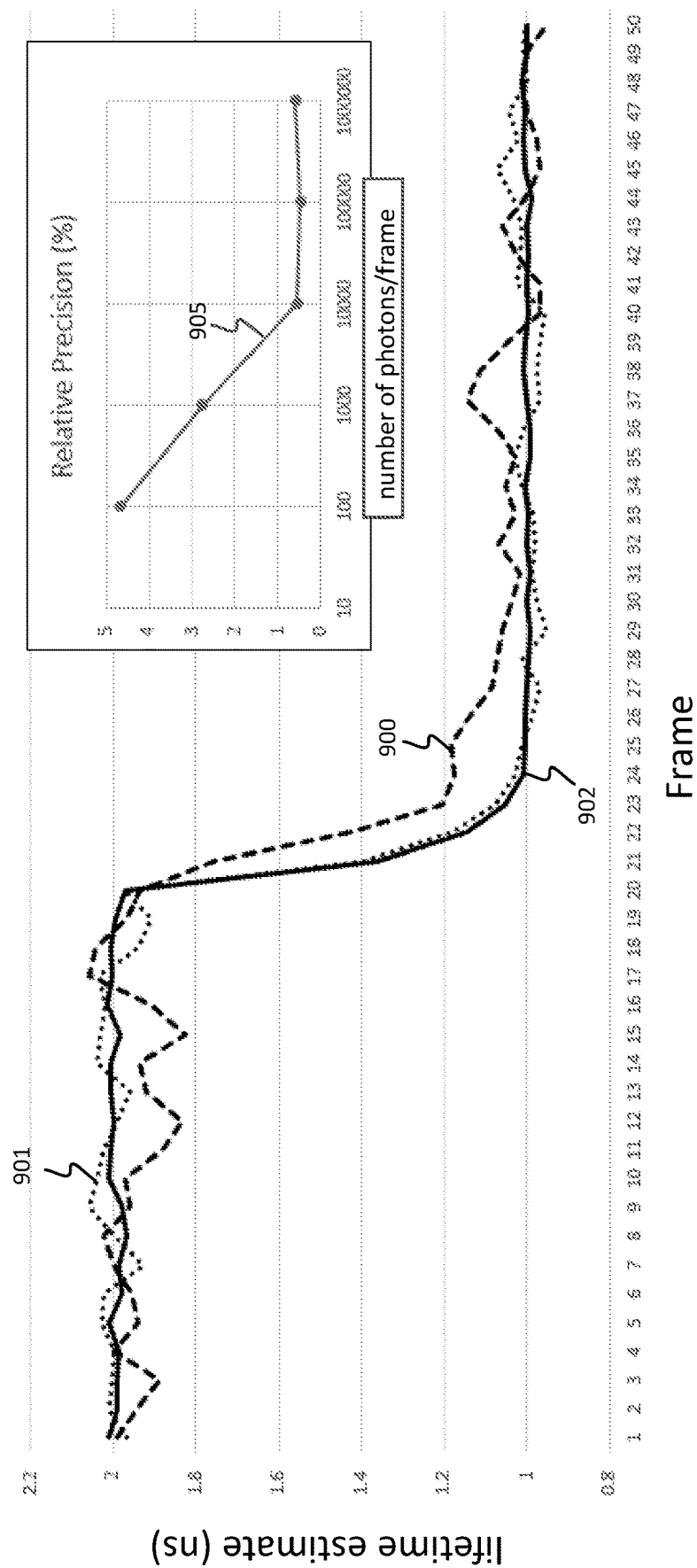
FIG. 16, shows a Phyton simulation using in-pixel second stage averaging based on the hybrid EMA averaging of FIG. 15, allowing for a four orders dynamic range of fluorescence light input level.

FIG. 16 gives a simulation based on n1=n2=100, a frame rate of 50 fps (20 ms per frame) simulated for 50 frames equaling 1 second. The window period width is 20 ns, the repetition frequency 50 MHz. The number of cycles per frame is thus 106. In this simulation the clock frequency is selected $f_{clk}$=5 kHz. The lifetime of the photons is chosen at 2 ns, with a sudden step-down after 20 frames to 1 ns. Curve 900 is the achieved estimated lifetime in a case whereby on average in only one out of ten thousand cycles a photon is received. For the one million cycles in a frame, there are per frame thus only 100 photons available. At frame 20, the applied lifetime drops at once to 1 ns. The estimated lifetime's response is taking some time and drops in 5-10 frames to 1 ns. A precision of 4.7% over frames is reached (as indicated by the curve 905 at X=100) in periods of constant lifetime. Ten times more photons per cycle, on average 1000 per frame, gives curve 901, with a faster step-down response in three to five frames and a better precision of 2.7%. 10.000 photons per frame leads to curve 902 with an even better precision of 0.5%. A 100.000 and 1.000.000 photons per frame have a similar step-response (curves not shown) and have a precision at the same low level of 0.5%. This set-up shows that a dynamic light input range of at least four orders of magnitude is supported thanks to the dual stage approach. There is no overflow of registers, and parameters do not need to be changed; so, it allows to operate an imager based on this principle, with that dynamic range of light levels on different places in one view simultaneously.

The hybrid EMA averaging principle can be used in any of the invention's averaging circuits.

Circuits in accordance with embodiments of the present invention can deviate largely from the presented ones. However, special care was taken to keep the transistor count low. Also, since most of the operation is in the digital domain, very limited analog difficulties are present. When envisaging a lifetime precision of 1%, it is also sufficient to have a low precision ADC (e.g. 8 bit) for conversion of the EMA voltage. The width and length (W/L values) of the transistors are not critical, and can be determined by the person skilled in the art. Most transistors can be of minimal width and length; however, one must check that curves 125 and 126 (FIG. 7) remain non-overlapping, and preferably reach the full power supply voltage, i.e. to make sure that the switches of the switched-capacitor circuit 160 operate optimally or at least sufficiently good.

Figure 6:
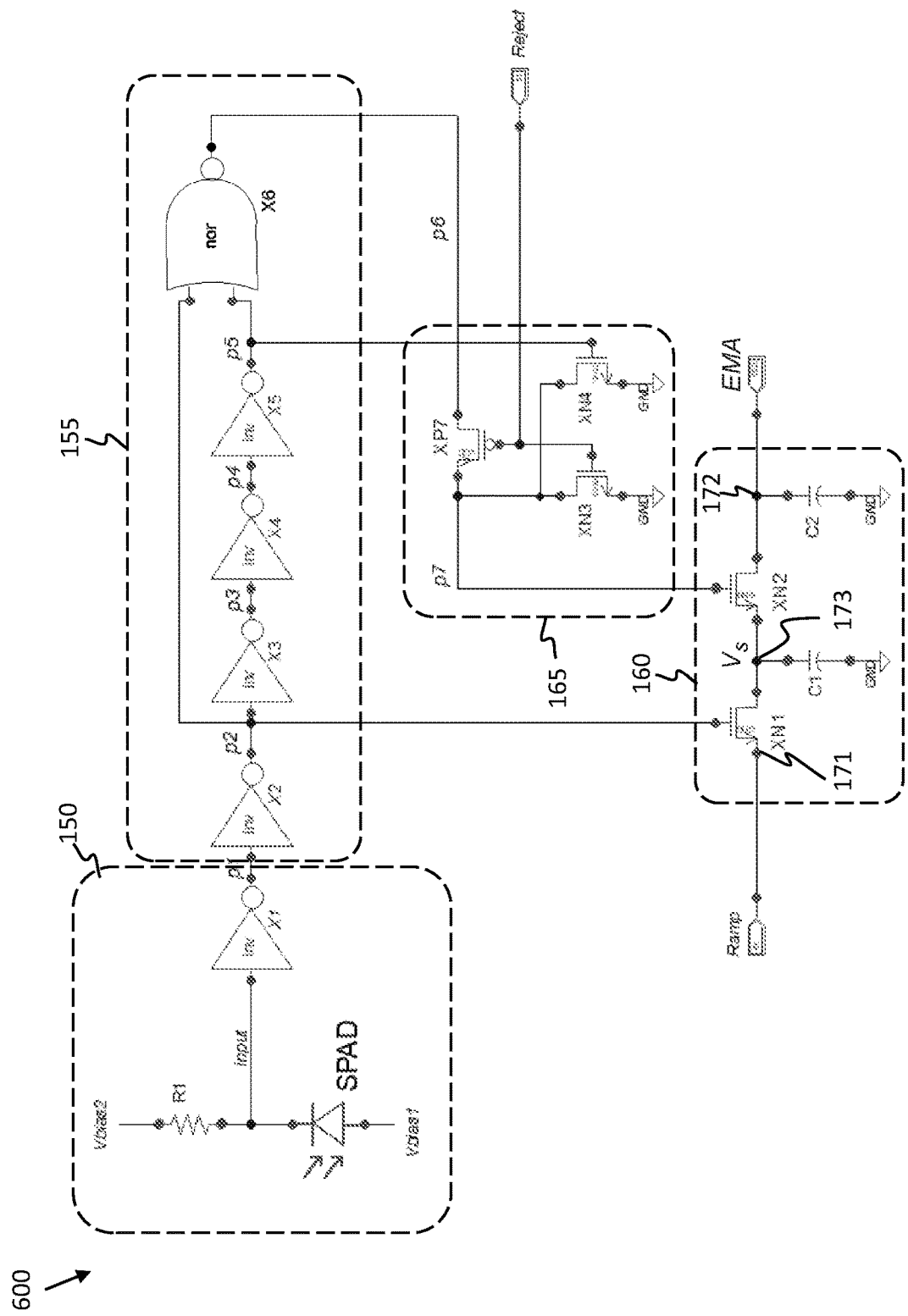
FIG. 6, shows an embodiment of a circuit implementation of embodiments the present invention having a single photon detection circuit 150, a non-overlapping switch-enable circuit 155, a pulse-inhibit circuit 165 and a switched-capacitor circuit 160.

As stated before, a more advantageous solution for the pulse-inhibit circuit than the one explained with reference to FIG. 5 is operative in the digital domain. FIG. 6 illustrates a fluorescence lifetime determination circuit 600 in accordance with embodiments of the present invention, including a digital domain pulse-inhibit circuit 165. Besides this pulse-inhibit circuit 165, the circuit 600 includes a single-photon detection circuit 150, a non-overlapping switch-enable circuit 155, and a switched-capacitor circuit 160. These latter components are as disclosed with respect to FIG. 5, and they are not explained again in detail here.

In the embodiment of FIG. 6, one of the signals driving the switched-capacitor circuit 160 can be intercepted, in that way preventing a pulse to be taken into account for performing the averaging. This is demonstrated in FIG. 6 wherein the pulse inhibit circuit 165 deletes in response to gating signal Reject unwanted pulses on the output node p6 of the NOR-gate X6 that fall outside the measurement time windows, and delivers a cleaned version of the signal on node p6 on node p7 going to pass-gate XN2 of the switched-capacitor circuit 160. In FIG. 4 the signal on node p6 is given in curve 120, and the cleaned version, i.e. the version with pulses outside the measurement time windows is given in curve 121. Inhibit circuit 165 as depicted in FIG. 6 can also be made in different ways, e.g. also by including an AND gate (not shown).

Figure 9:
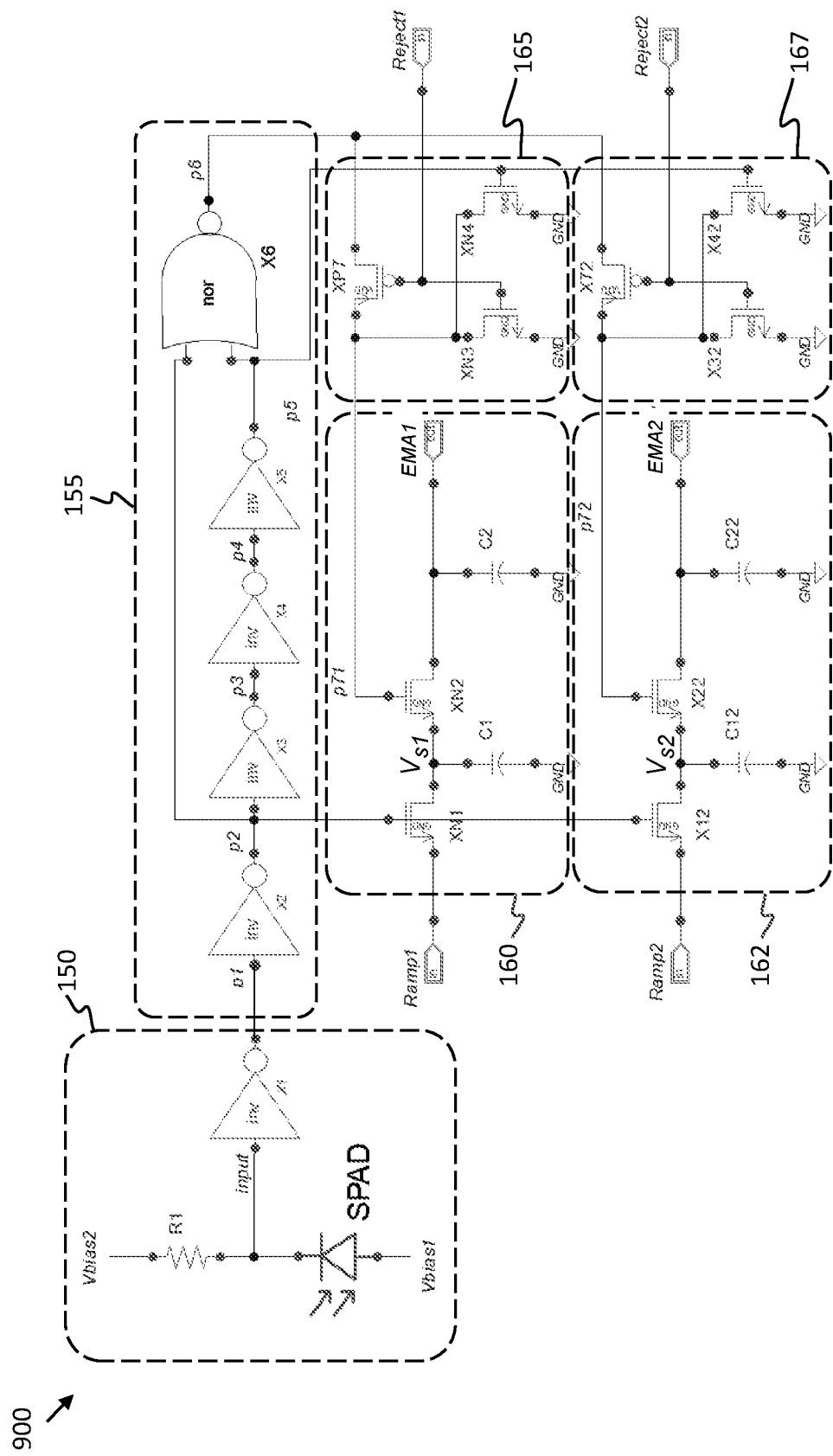
FIG. 9, embodies a circuit whereby two exponential moving averages are computed in two different time windows by a single non-overlapping switch-enable circuit 155, two distinct inhibit circuits 165 and 167, and two distinct switched-capacitor circuits 160 and 162, leading to two exponential moving averages EMA1 and EMA2, according to embodiments of the present invention.

One of the nice features of the particular solution presented in FIG. 6 is that, as illustrated in the detector 900 of FIG. 9, with only an additional 5 transistors and two capacitors a second EMA2 switched-capacitor circuit 162 with its own time window and same or different voltage ramp signal Ramp2, and second pulse-inhibit circuit 167 may be fabricated that can operate entirely independent of (but simultaneously with) the first EMA1 switched-capacitor circuit 160 and pulse-inhibit circuit 165. In image sensors, the area of additional circuitry has to be kept low, because in lower cost monolithic solutions, the area that circuitry occupies is in trade-off with that for the actual light detection area. Due to the small required area the number of center-of-mass measurements that operate in parallel can be increased, in which sampled photons can be allowed or inhibited depending on dedicated applied windows . . . .

Figure 10:
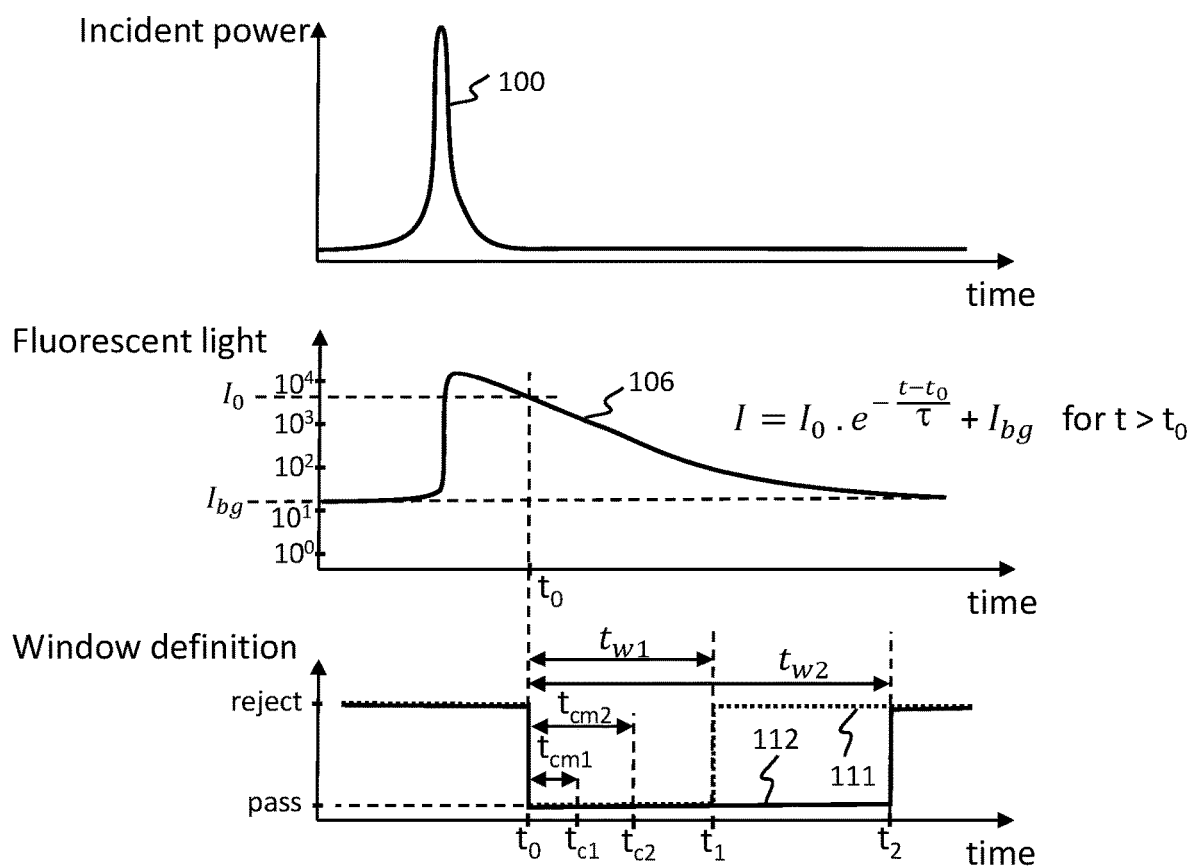
FIG. 10, illustrates a definition of two time-windows $t_{w1}$ 111, and $t_{w2}$ 112, that measure two centers of mass $t_{cm1}$ and $t_{cm2}$, according to the circuit in FIG. 9, allowing estimation of the lifetime $\tau$, whilst eliminating the effect of the background light $I_{bg}$.

FIG. 10 shows a very useful application of performing measuring two centers of mass of the input light. In the case there is also background light, that is uncorrelated to the excitation light 100, one gets a light reception that has following behavior:

$$I = I_0 \cdot e^{-\frac{t-t_0}{\tau}} + I_{bg} \text{ for } t > t_0$$

$I_{bg}$ is the background light component that generates events at random moments in the input signal. The center of mass $t_{cm1}$ in the first measurement time window 111 with a first, shorter, measurement period $t_{w1}$, starting at time t0 and ending at time $t_1$, is going to be distorted towards the center of the window (i.e. closer to $t_{w1}/2$) due to these random events. By including a second center of mass measurement based on a second measurement time window 112 that also starts at time t0 but that ends at time $t_2$ later than time $t_1$, hence with a second, longer, measurement period $t_{w2}$ taken e.g. twice as long as the first window $t_{w1}$, one has an extra equation to which the system needs to adhere. In this way there are two equations with two unknowns: lifetime τ and background light $I_{bg}$. Persons skilled in art can accurately retrieve the lifetime stripped from the background light interference by solving these equations. The precision on the outcome will be somewhat reduced due to the shot-noise of the background light, which can't be avoided.

In embodiments of the present invention, single photon detection circuits 150 may have elevated dark count rates (DCR), giving the same effect as background light. DCR can thus be treated in the same way, using a double center of mass approach as explained with respect to FIG. 10. Measuring multiple centers of mass can be achieved in parallel, using extra circuitry on board of each pixel in an image sensor as just mentioned, or, consecutively, assuming non changing conditions in the scene, one after the other using the same circuitry. A combination can also be anticipated, e.g. measuring first two centers of mass in parallel, and then another two centers of mass, when hardware is only equipped for two in parallel.

Figure 11:
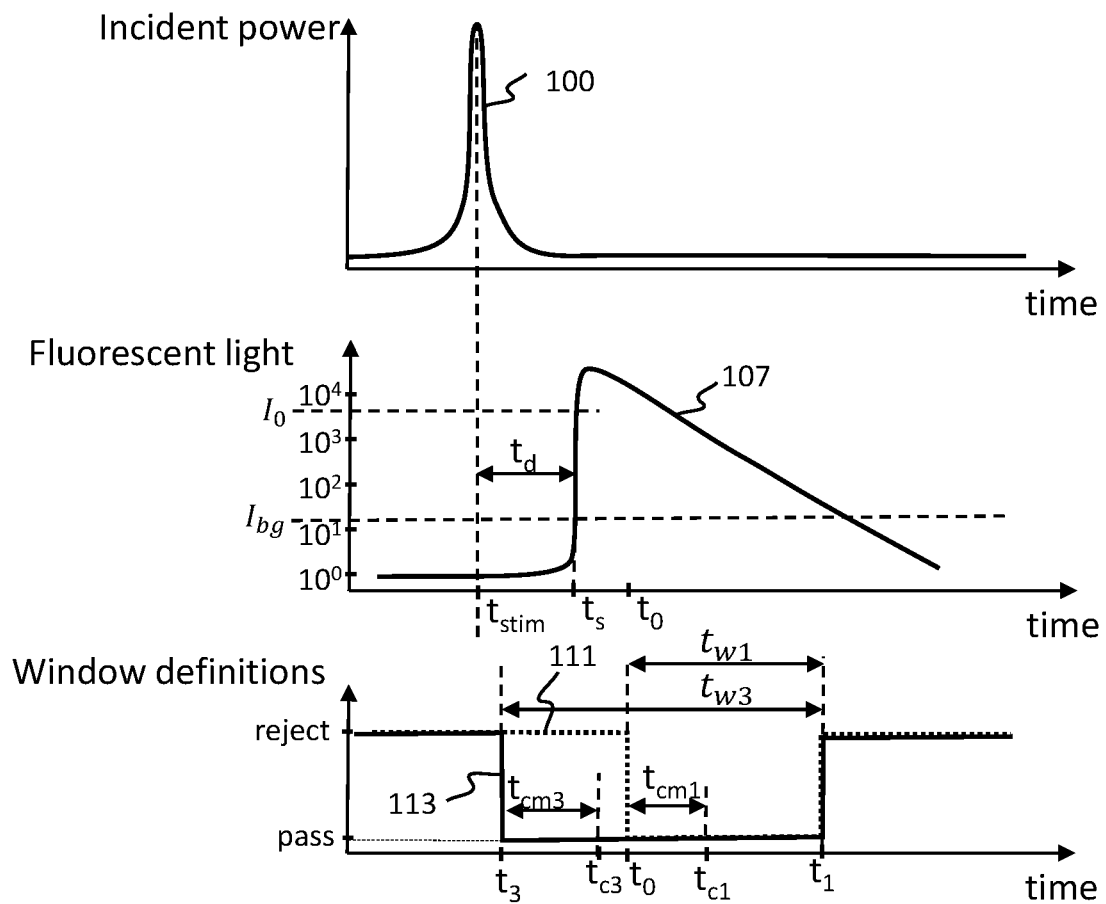
FIG. 11 illustrates a definition of a first window $t_{w1}$ 111 for measuring fluorescence lifetime $\tau$ and a second window $t_{w3}$ 113, useful to estimate the effect of delays of the traveling of the fluorescence light and the signals in the electrical transmission lines in order to derive an approximate value for the delay $t_d$.

FIG. 11 shows another use of the double center of mass approach. In a lifetime measurement with short lifetimes of the order of nanoseconds, each signal transmission in the set-up has a substantial delay, be it for electrical signals, travelling at 60-70% of the light velocity, or the light itself. To achieve best precision and accuracy, it is always preferred to position the measurement time window starting at t0, not too much after the maximum moment $t_s$ of the fluorescence light 107. Therefore, it is useful to first find the delay $t_d$ between the excitation pulse and the actual emission of fluorescent light, being function of all involved transmission lines, pathways of light, and on the whole synchronisation principle in the implemented system. A further measurement time window with a starting moment $t_3$, conveniently chosen such that one is certain that $t_3$ is before $t_s$, the starting time of emission of fluorescent light, and with measurement window period $t_{w3}$, is put in place. In the example illustrated in FIG. 11, the further measurement time window has an end time $t_1$, just like the other measurement time window used, which has a starting time t0 and end time $t_1$. The measured center of mass $t_{cm3}$ of the further measurement time window will point to the moment in time $t_{c3}$, that will be beyond the starting time $t_s$ of emission of fluorescent light, and an estimate can then be made to roughly locate $t_s$.

Figure 12:
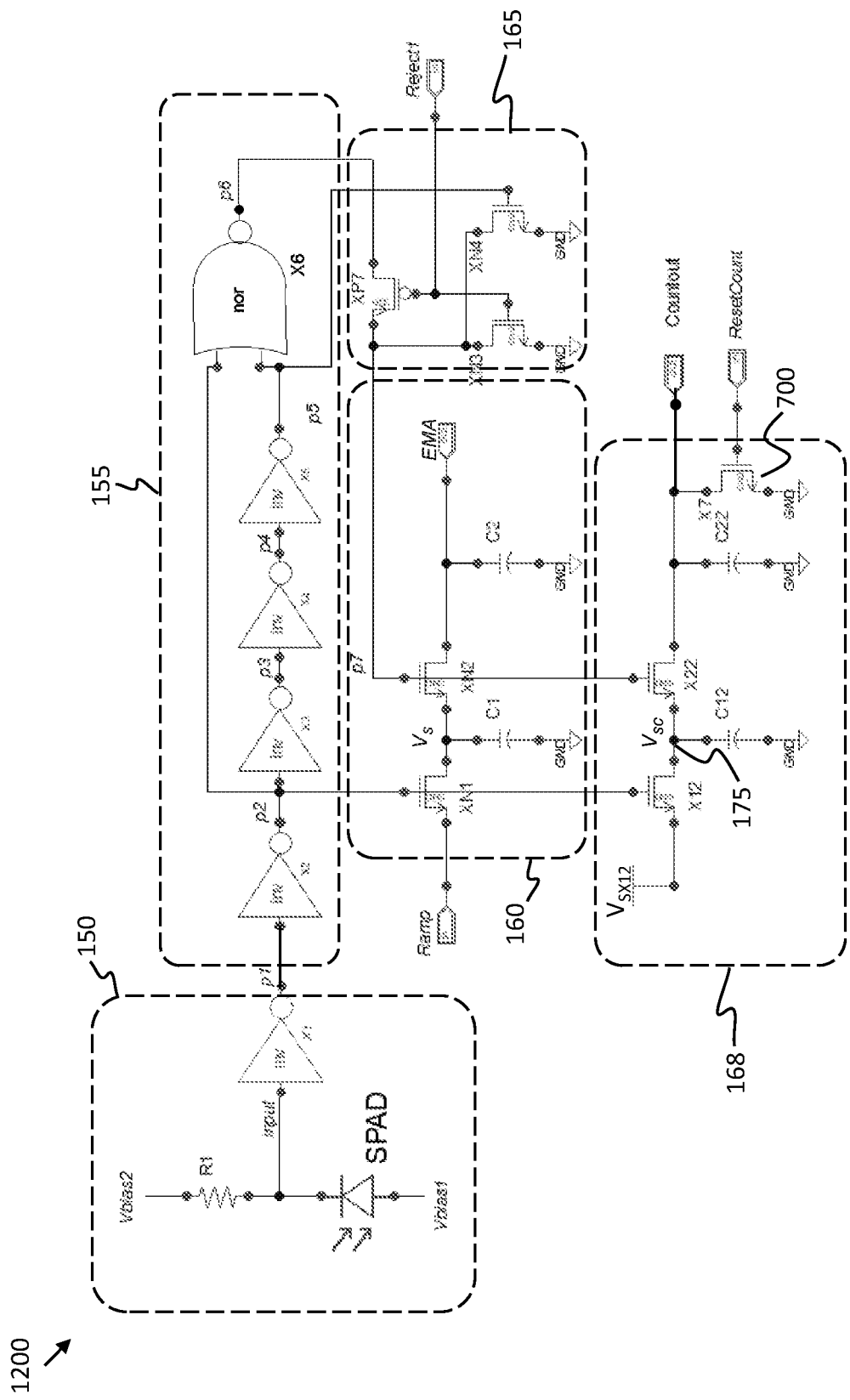
FIG. 12 illustrates a circuit that embodies that beside the center of mass also the number of arrived photons in the time window can be counted using event counter 168, according to embodiments of the present invention

FIG. 12 shows that a fluorescence lifetime determination circuit 1200 in accordance with embodiments of the present invention can conveniently include an analog photon-counter circuit 168, giving information about the number of events passing the measurement window periods, since a moment when a reset pulse on a ResetCount input has been applied.

The photon-counter circuit 168 illustrated in FIG. 12 is only one embodiment of a possible implementation. It comprises a series connection of pass-gate switches X12, X22, for instance NMOS pass-gate switches, with a counter sampling node 175 between both pass-gate switches X12, X22. A sampling capacitor C12 is coupled between ground and the counter sampling node 175. The source side of the first pass-gate switch X12 is coupled to a fixed voltage $V_{SX12}$ below Vdd, not shown, and the drain side of the second pass-gate switch X22 is coupled to an output node Countout. A further capacitor C22 is coupled between ground and the drain of the second pass-gate switch X22. The first and second pass-gate switches X12, X22 are actuated by the same signals which also actuate pass-gates XN1, XN2 in the switched-capacitor circuit 160, e.g. these signals are fed to the gates of the pass-gate switches X12, X22.

When no trigger pulse occurs, the signal at the gate of pass-gate X12 is the signal at node p2, and this signal is high. The voltage level $V_{sc}$ at the drain side of pass-gate X12 then equals $V_{SX12}$. When a trigger pulse occurs, this voltage at the counter sampling node 175 is sampled.

The signal at node p7, not overlapping with the signal at node p2, now goes high, making the second pass-gate switch X22 conductive. The capacitors C12 and C22 get shorted to each other, and a charge sharing redistribution takes place whereby the signal at the counter sampling node 175 and the signal at the output node Countout move to each other determined by the ratio of C22/C12.

This way, the voltage at the output node Countout steps up, every time such events happens, but in a saturating way: every step on Countout will be a bit smaller, and in the end, a saturation voltage close to $V_{SX12}$. This counter number at saturation depends on the chosen capacitor ratio C22/C12. C12 can be entirely made-up of its parasitic node, keeping the circuit small. One can implement counter values between ten and a few hundreds, without needing a too large capacitor C22.

A reset switch 700 is coupled between the output node Countout and ground, for resetting the output node Countout. The reset switch 700 may for instance be a transistor, the gate of which is coupled to an externally applied signal ResetCount.

Figure 13:
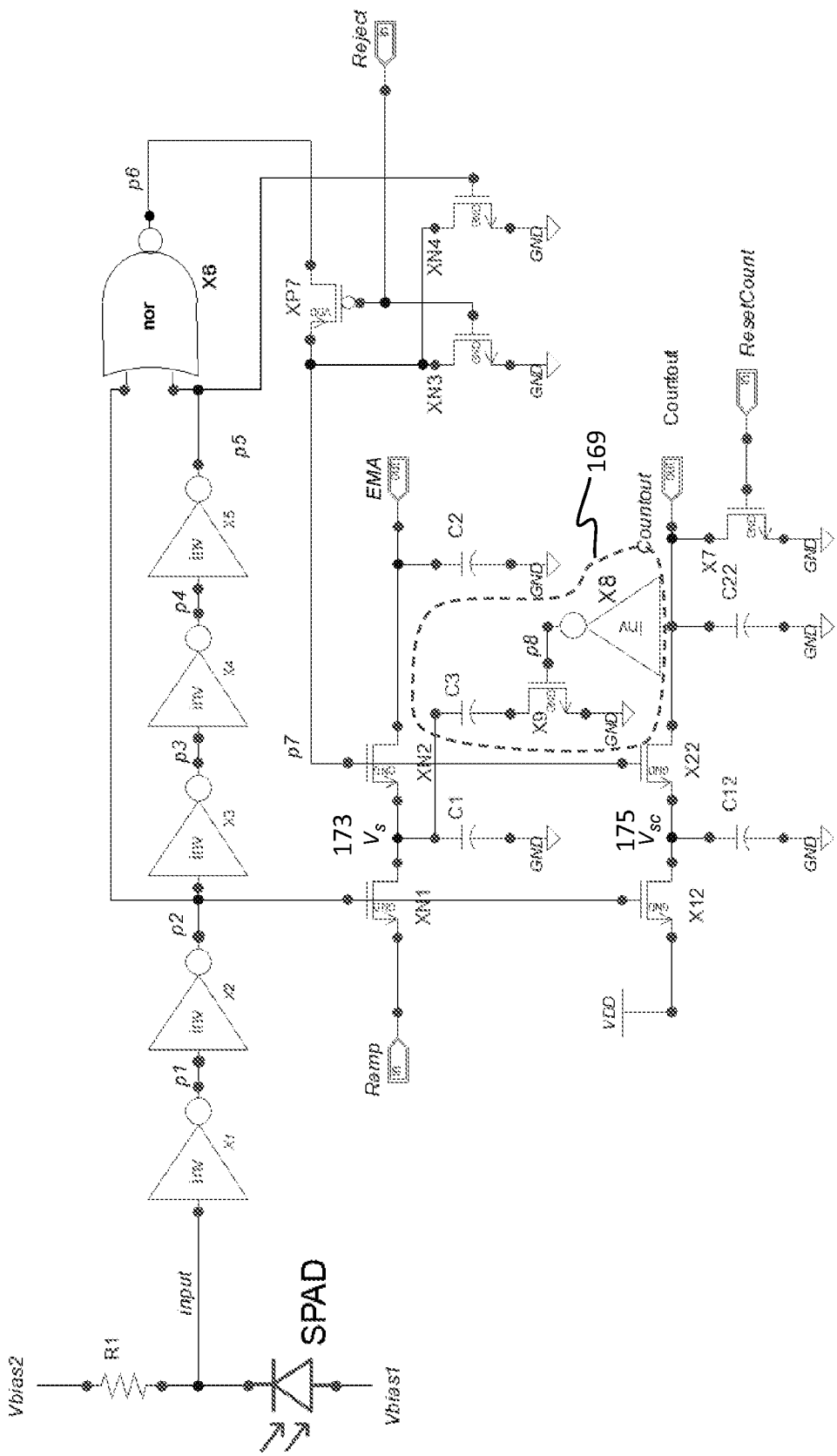
FIG. 13 illustrates a circuit wherein the weight of the exponential moving averaging can be run-time adapted locally to the number of counted incident photons, according to embodiments of the present invention, using adaptive-weighing circuit 169.

Sometimes it is known that the EMA average voltage is not yet converged, e.g. right after start-up, or when a different lifetime is suddenly present. In that case, it is possible to speed-up the convergence process by temporarily lowering the n-number of the switched capacitor circuit 160. In fact, by changing the value of capacitor C1, averaging-length n can be modulated in a convenient way. This can be done by externally adding capacitors to the sample node 173. However, averaging-length n can also be linked to the number of photons that passed the window, making use of a photon counter 168. In FIG. 13 this is demonstrated in following way: a circuit 169 monitors whether a predetermined number of photons has been counted after the reset-pulse on input ResetCount. Before that, an external capacitor C3 is added to the first capacitor C1 of the switched-capacitor circuit 160 by means of a switch X9. The averaging-length n is short, and the EMA moves quickly, giving a rough and quick estimation of the center of mass. After that, the external capacitor C3 is detached because the actuation signal to the gate of switch X9 (at node p8) goes low, and averaging length n is increased, leading to a more precise measurement starting then from the rough approximate first estimate. In this way, curve 140 of FIG. 8, could have a much steeper slope, e.g. and instead of needing 75 samples to reach the rough estimate, get there in 10 steps. The circuit in FIG. 13 works in a digital way, but of course more advanced solutions leading to a softer increase in averaging-length n can be made by the person skilled in the art. E.g., one can make use of the variability of the channel capacitance of a transistor or use a dedicated varactor.

Sometimes, one has a combination of fluorophores that output two lifetimes upon stimulation:

$$I = I_0 \cdot e^{-\frac{t-t_0}{\tau_1}} + I_1 \cdot e^{-\frac{t-t_0}{\tau_2}}$$

for $t > t_0$
In this case, three unknowns need to be found, being the first lifetime $\tau_1$, the second lifetime $\tau_2$ and the ratio of the intensities of emitted fluorescent light at the first moment $t_0$ $I_1/I_0$.

Figure 14:
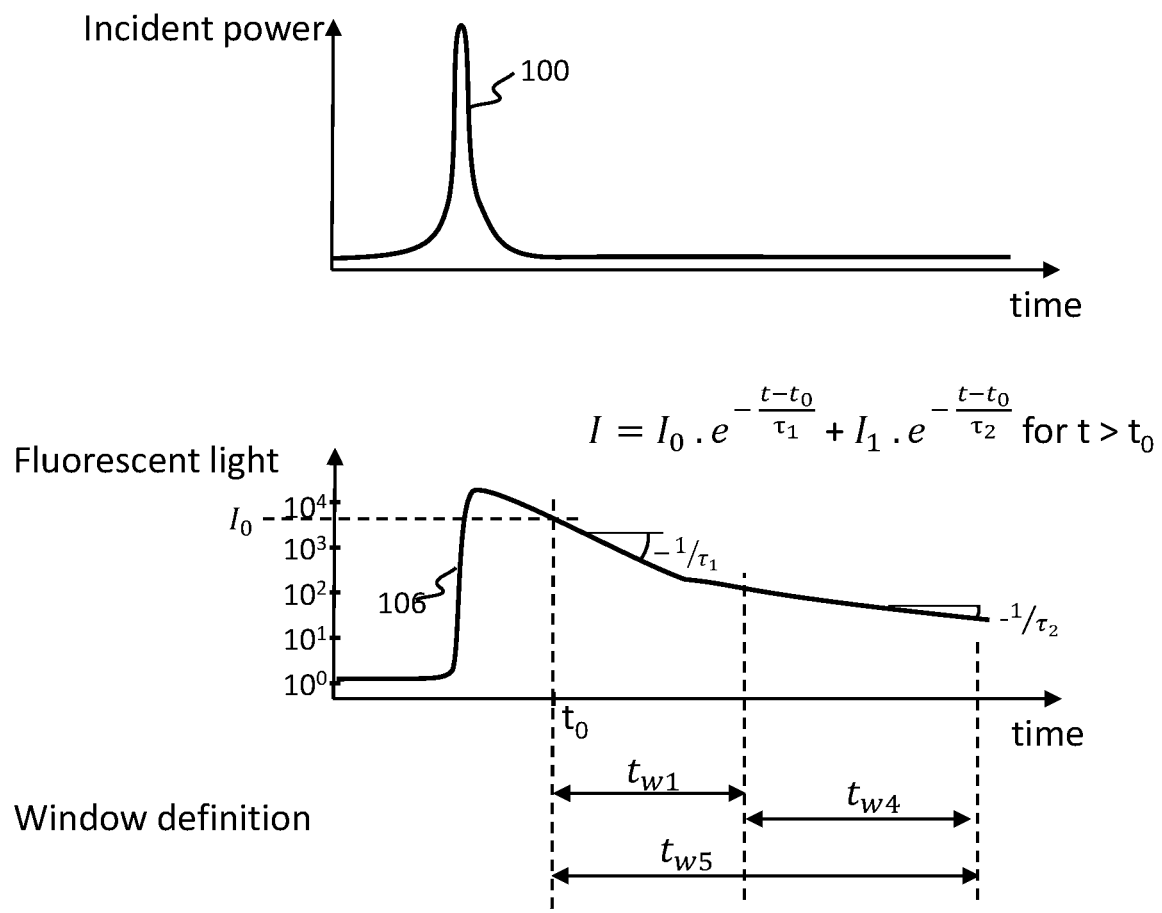
FIG. 14 shows an example of a definition of windows $t_{w1}$, $t_{w4}$ and $t_{w5}$ for measuring fluorescence light that contains two fluorescence lifetimes $\tau_1$ and $\tau_2$, possibly due to the presence of two different fluorophores in the illuminated region. For achieving those measurements in parallel in hardware on a per pixel base, the circuit of FIG. 9 can be complemented by an additional third inhibit circuit and switched-capacitor circuit (not shown).

If this is the case, finding three centers of mass is required. To solve this, one must choose three measurement time windows in a strategic way. As an example, FIG. 14 shows an option for these three measurement time windows, a first measurement time window $t_{w1}$, a second measurement time window $t_{w4}$ which falls later in time, and a third measurement time window $t_{w5}$ which is as long as the first and second measurement time windows together.

The shorter lifetime will mostly influence the center of mass in the first measurement time window $t_{w1}$. The longer lifetime will mostly influence the center of mass in the second measurement time window $t_{w4}$, and the center of mass in $t_{w5}$ will be largely influenced by each of the three unknowns. Anyhow, the person skilled in the art can solve the three equations based on the three measured centers of mass and find the three unknowns in the way he/she prefers most. Adding the possibility of having also non-negligible background light or DCR (of the single photon detection circuit 150), this would add yet another unknown variable that can retrieved by an additional center of mass measurement time window (not illustrated) and its mathematical equation (having 4 unknowns and 4 equations).

Any of the systems that are presented here, or that are based on it, can be complemented by other means known in the state of the art in image sensors. For example, one can apply micro-lenses, colour filters, to improve qualitatively, or quantitatively the light input to the single photon detection circuit. Any means for improving the internal/external quantum efficiency, responsivity, and detection probability can be applied. Three-dimensional stacking can be done, e.g. whereby a SPAD detector layer stems from another wafer/material then the CMOS circuit wafer. Back-side illumination (BSI) can be applied, current assistance can be applied or an Silicon On Insulator (SOI) can be favoured. The proposed embodiments of the invention can be laid out as pixels for a sensor array, in total constituting an image sensor for fluorescence lifetime and fluorescence light intensity acquisition. For each read-out voltage node, a voltage-follower transistor, can be provided, with a row-select transistor for row-based read-out, as is often done in CMOS image sensors. Several signals can be grouped for a plurality of pixels, or are the same for a whole array, like the ones defining the windows (Reject), the Ramp signal(s), reset signal(s), and signals determining the averaging-length n. In addition to all this, a standard 3T or 4T image sensor pixel can be added, for performing simultaneously standard image sensing. The single-photon detection circuit 150 may contain a regular SPAD, but can also contain any other means to achieve single photon detection, including an avalanche photodetector (APD) with so much gain, that one can use the linear gain modus to operate the diode below break-down and still achieve digital photon arrival pulses.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

The invention claimed is:
1. A detection system for detecting fluorescence lifetime, the detection system comprising:
an excitation light source configured for repeatedly generating pulsed excitation light, and a detector comprising:
a single-photon detection circuit for generating digital pulses upon detection of photons,
a pulse-inhibit circuit for rejecting detected photons that occur outside each one of a series of measurement time windows, each subsequent measurement time window starting after a subsequent excitation light pulse has stopped and stopping before a next excitation light pulse is generated, each measurement time window having a measurement window period, a first switched-capacitor circuit having an input terminal for receiving a voltage ramp signal that is restarted with each new measurement window period, the first switched-capacitor circuit being configured for repetitively computing an average voltage, based on an exponential moving average function applied to sample voltages recorded over past measurement time windows and determined by the voltage ramp signal in response to detected and not rejected photons, following the principles of the center-of-mass method, the first switched-capacitor circuit having a first node for outputting the computed average voltage as a measure of the fluorescence lifetime.

2. The detection system in accordance with claim 1, wherein the first switched-capacitor circuit comprises a first sampling capacitor, a first switch and a second switch for coupling the first sampling capacitor alternately to a ramp terminal for receiving a ramp signal, and to the first node.

3. The detection system in accordance with claim 2, wherein the first switched-capacitor circuit furthermore comprises a second capacitor configured for being in a charge sharing redistribution configuration when the second switch is driven for coupling the first sampling capacitor to the first node.

4. The detection system in accordance with claim 3, wherein the first sampling capacitor is at least an order of magnitude, preferably at least two orders of magnitude, smaller than the second capacitor.

5. The detection system in accordance with claim 2, further comprising means for temporarily adding one or more capacitors in parallel to the first sampling capacitor.

6. The detection system in accordance with claim 1, further comprising a second switched-capacitor circuit connected in series to the first node of the first switched-capacitor circuit and configured for operating at an oscillation rate that is not in direct response to incident photons.

7. The detection system in accordance with claim 6, wherein the second switched-capacitor circuit comprises a second sampling capacitor, a first switch and a second switch for coupling the second sampling capacitor alternately to the first node for receiving computed average voltage as a measure of the fluorescence lifetime, and to an output node.

8. The detection system in accordance with claim 7, wherein the second switched-capacitor circuit furthermore comprises a fourth capacitor configured for being in a charge sharing redistribution configuration when the second switch is driven for coupling the second sampling capacitor to the output node.

9. The detection system in accordance with claim 8, wherein the second sampling capacitor is at least an order of magnitude, preferably at least two orders of magnitude, smaller than the fourth capacitor.

10. The detection system in accordance with claim 1, furthermore comprising a non-overlapping switch-enable circuit for providing non-overlapping signals for actuating the first switched-capacitor circuit.

11. The detection system in accordance with claim 1, wherein the single-photon detection circuit comprises a single photon avalanche detector.

12. The detection system in accordance with claim 11, wherein the pulse-inhibit circuit comprises a variable voltage source adapted for lowering a voltage over the single photon avalanche detector.

13. The detection system in accordance with claim 1, wherein the pulse-inhibit circuit is adapted for intercepting one of the signals for driving the switched-capacitor circuit, for thus preventing a pulse to be taken into account.

14. The detection system in accordance with claim 13, further comprising at least one further pulse-inhibit circuit and at least one further switched-capacitor circuit, configured for operating in parallel with the pulse-inhibit circuit and the first switched-capacitor circuit.

15. The detection system in accordance with claim 1, further comprising a photon counter circuit for counting a number of detected photons.

16. The detection system in accordance with claim 15, furthermore comprising a non-overlapping switch-enable circuit for providing non-overlapping signals for actuating the first switched-capacitor circuit, wherein the photon counter circuit comprises a switched capacitor circuit adapted to be actuated by the non-overlapping signals for actuating the first switched-capacitor circuit.

17. The detection system in accordance with claim 15, further comprising means for temporarily adding one or more capacitors in parallel to the first sampling capacitor, wherein the means for temporarily adding one or more capacitors in parallel to the sampling capacitor comprise one or more switches, in series with the one or more capacitors, respectively, the one or more switches being opened upon the photon counter circuit having counted a predetermined number of detected photons.

18. A fluorescence imaging sensor comprising:

an excitation light source configured for repeatedly generating pulsed excitation light, and an array of detectors, each detector comprising:

a single-photon detection circuit for generating digital pulses upon detection of photons, a pulse-inhibit circuit for rejecting detected photons that occur outside each one of a series of measurement time windows, each subsequent measurement time window starting after a subsequent excitation light pulse has stopped and stopping before a next excitation light pulse is generated, each measurement time window having a measurement window period, a first switched-capacitor circuit having an input terminal for receiving a voltage ramp signal that is restarted with each new measurement window period, the first switched-capacitor circuit being configured for repetitively computing an average voltage, based on an exponential moving average function applied to sample voltages recorded over past measurement time windows and determined by the voltage ramp signal in response to detected and not rejected photons, following the principles of the center-of-mass method, the first switched-capacitor circuit having a first node for outputting the computed average voltage as a measure of the fluorescence lifetime.

19. A method for determining fluorescence lifetime, comprising generating digital pulses upon detection of photons; rejecting detected photons that occur outside a measurement time window; computing an average voltage, based on an exponential moving average function applied to sample voltages determined by a voltage ramp signal in response to the detected and not rejected photons, recorded over past measurement time windows following the principles of the center-of-mass method; and outputting the computed average voltage as a measure of the fluorescence lifetime.

20. The method according to claim 19, further comprising averaging the computed average voltage.

* * * * *